US012577042B2

(12) United States Patent
Fisher et al.

(10) Patent No.: US 12,577,042 B2
(45) Date of Patent: Mar. 17, 2026

(54) REFUSE VEHICLE WITH SELF-CONTAINED BODY

(71) Applicant: Oshkosh Corporation, Oshkosh, WI (US)

(72) Inventors: Aaron Fisher, Oshkosh, WI (US); Greg Steffens, Oshkosh, WI (US); Jeff Verhagen, Oshkosh, WI (US); Ryan Wolf, Oshkosh, WI (US); Jon Branson, Oshkosh, WI (US); Sam Mueller, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 458 days.

(21) Appl. No.: 18/170,879

(22) Filed: Feb. 17, 2023

(65) Prior Publication Data

US 2023/0348183 A1 Nov. 2, 2023

Related U.S. Application Data

(60) Provisional application No. 63/325,672, filed on Mar. 31, 2022.

(51) Int. Cl.
*B65F 3/04* (2006.01)
*B65F 3/06* (2006.01)
*B65F 3/02* (2006.01)

(52) U.S. Cl.
CPC ................ *B65F 3/041* (2013.01); *B65F 3/06* (2013.01); *B65F 2003/023* (2013.01); *B65F 2003/0279* (2013.01)

(58) Field of Classification Search
CPC ........................... B65F 2003/008; B65F 3/041
See application file for complete search history.

(56) References Cited

U.S. PATENT DOCUMENTS 3,202,305 A * 8/1965 Herpich .................... B60P 1/50 414/501
3,370,525 A * 2/1968 Samuel ..................... B65F 3/20 100/220
5,203,669 A * 4/1993 Klossek .................. B65F 3/201 414/525.2
5,474,413 A * 12/1995 Georg ..................... B65F 3/201 414/408

(Continued)

OTHER PUBLICATIONS https://info.macktrucks.com/refuse-revolution; "Welcome to the refuse revolution. Mack LR Electric." Retrieved on Mar. 21, 2023.

(Continued)

*Primary Examiner* — Jonathan Snelting
(74) *Attorney, Agent, or Firm* — Foley & Lardner LLP

(57) ABSTRACT

A refuse vehicle that includes a chassis and a body assembly. The body assembly is removably coupled with the chassis. The body assembly includes a hydraulic system and an electrical system. The hydraulic system includes a hydraulic pump and a reservoir, the hydraulic pump and the reservoir coupled with the body assembly. The electrical system includes a controller coupled with the body assembly. The body assembly is configured to be removed from the chassis without requiring decoupling of the hydraulic pump or the reservoir from the body assembly, and without requiring decoupling of the controller from the body assembly.

21 Claims, 27 Drawing Sheets

(56) References Cited

U.S. PATENT DOCUMENTS

| | | | | |
|---|---|---|---|---|
| 5,741,107 | A * | 4/1998 | Georg | B65F 3/143 414/525.6 |
| 6,497,547 | B1 * | 12/2002 | Maglaras | B65F 3/28 414/525.5 |
| 6,733,027 | B2 * | 5/2004 | Stragier | B65F 3/00 410/80 |
| 7,066,705 | B1 * | 6/2006 | Keller | B65F 3/205 414/525.51 |
| 2004/0071537 | A1 * | 4/2004 | Pruteanu | B65F 3/00 414/525.2 |
| 2016/0375805 | A1 | 12/2016 | Krueger et al. | |
| 2019/0276102 | A1 | 9/2019 | Zuleger et al. | |
| 2020/0247486 | A1 | 8/2020 | Groteleuschen et al. | |
| 2020/0256649 | A1 | 8/2020 | Krueger et al. | |
| 2020/0290237 | A1 | 9/2020 | Steffens et al. | |
| 2020/0291846 | A1 | 9/2020 | Steffens et al. | |
| 2021/0171137 | A1 | 6/2021 | Zuleger et al. | |
| 2021/0276643 | A1 | 9/2021 | Ellifson et al. | |
| 2022/0072736 | A1 | 3/2022 | Steffens et al. | |
| 2022/0118854 | A1 | 4/2022 | Davis et al. | |
| 2022/0260344 | A1 | 8/2022 | Krueger et al. | |
| 2023/0070279 | A1 | 3/2023 | Wheeler et al. | |
| 2023/0070769 | A1 | 3/2023 | Wheeler et al. | |
| 2023/0074504 | A1 | 3/2023 | Ellifson et al. | |

OTHER PUBLICATIONS https://www.youtube.com/watch?v=NQFtAnm7D-c; "All-New Mack LR Electric Garbage Truck." Retrieved on Mar. 21, 2023.

* cited by examiner

REFUSE VEHICLE WITH SELF-CONTAINED BODY

CROSS-REFERENCE TO RELATED PATENT APPLICATION

This application claims the benefit of and priority to U.S. Provisional Application No. 63/325,672, filed Mar. 31, 2022, the entire disclosure of which is incorporated by reference herein.

BACKGROUND

The present disclosure relates generally to vehicles. More specifically, the present disclosure relates to a body for a refuse vehicle.

SUMMARY

One implementation of the present disclosure relates to a refuse vehicle, according to some embodiments. In some embodiments, the refuse vehicle includes a chassis, and a body assembly that is configured to be removably coupled with the chassis. In some embodiments, the body assembly includes a refuse body, a hydraulic system, and an electrical system. In some embodiments, the hydraulic system includes a hydraulic pump and a reservoir. In some embodiments, the hydraulic pump and the reservoir directly coupled to the refuse body. In some embodiments, the electrical system includes a body controller coupled with the refuse body. In some embodiments, the body assembly is configured to be removed from the chassis without requiring decoupling of the hydraulic pump or the reservoir from the refuse body, and without requiring decoupling of the body controller from the refuse body.

In some embodiments, the refuse vehicle further includes a hydraulic accessory. In some embodiments, the hydraulic accessory is configured to receive pressurized hydraulic fluid from the hydraulic pump and perform an operation using the pressurized hydraulic fluid. In some embodiments, the hydraulic accessory is coupled on the refuse body such that the body assembly can be removed from the chassis without removing the hydraulic accessory from the refuse body.

In some embodiments, the refuse vehicle further includes a lift assembly and a grabber assembly. In some embodiments, the lift assembly is configured to receive pressurized hydraulic fluid from the hydraulic pump and operate to lift the grabber assembly. In some embodiments, the grabber assembly is configured to receive pressurized hydraulic fluid from the hydraulic pump and operate to drive a pair of grabber fingers to grasp a refuse container. In some embodiments, the lift assembly and the grabber assembly are coupled on the refuse body such that the body assembly can be removed from the chassis without removing the lift assembly or the grabber assembly from the refuse body. In some embodiments, the hydraulic pump and the reservoir are coupled on a longitudinal front end of the refuse body, between the longitudinal front end of the refuse body and a cab of the refuse vehicle.

In some embodiments, the electrical system further includes multiple electric wires. In some embodiments, the electric wires are directly coupled to the refuse body such that the body assembly can be removed from the chassis without removing the electric wires from the refuse body.

In some embodiments, the hydraulic system further includes a packer manifold and an arm manifold. In some embodiments, the packer manifold is configured to direct pressurized hydraulic fluid to a packer of the refuse vehicle. In some embodiments, the arm manifold is configured to direct pressurized hydraulic fluid to an arm of the refuse vehicle. In some embodiments, the packer manifold and the arm manifold are coupled to the refuse body such that the body assembly can be removed from the chassis without removing the arm manifold or the packer manifold from the refuse body.

In some embodiments, the body assembly includes a pair of rails that extend along a bottom of the body assembly and multiple body mounts. In some embodiments, the body mounts are coupled with the pair of rails of the body assembly and are configured to removably couple with the chassis. In some embodiments, the refuse body defines a refuse compartment for loading, storing, and discharging refuse.

In some embodiments, the electrical system further includes multiple accessories. In some embodiments, the accessories includes at least one camera. In some embodiments, one or more communication wires extend between the body controller and the at least one camera through a cover that extends along an external surface of the refuse body.

Another implementation of the present disclosure is a self-contained body assembly for a refuse vehicle, according to some embodiments. In some embodiments, the self-contained body assembly includes a refuse body, a hydraulic system, and an electrical system. In some embodiments, the hydraulic system includes a hydraulic pump and a reservoir. In some embodiments, the hydraulic pump and the reservoir are directly coupled to the refuse body. In some embodiments, the electrical system includes a body controller coupled with the refuse body. In some embodiments, the self-contained body assembly is configured to be removably coupled with a chassis and removed from the chassis without decoupling the hydraulic system from the refuse body and without requiring decoupling of the body controller from the refuse body.

In some embodiments, self-contained body assembly further includes a hydraulic accessory configured to receive pressurized hydraulic fluid from the hydraulic pump and perform an operation using the pressurized hydraulic fluid. In some embodiments, the hydraulic accessory is coupled on the refuse body such that the body assembly can be removed from the chassis without removing the hydraulic accessory from the refuse body.

In some embodiments, the self-contained body assembly further includes a lift assembly and a grabber assembly. In some embodiments, the lift assembly is configured to receive pressurized hydraulic fluid from the hydraulic pump and operate to lift the grabber assembly. In some embodiments, the grabber assembly is configured to receive pressurized hydraulic fluid from the hydraulic pump and operate to drive a pair of grabber fingers to grasp a refuse container. In some embodiments, the lift assembly and the grabber assembly are coupled on the refuse body such that the body assembly can be removed from the chassis without removing the lift assembly or the grabber assembly from the refuse body. In some embodiments, the hydraulic pump and the reservoir are coupled on a longitudinal front end of the refuse body, between the longitudinal front end of the refuse body and a cab of the refuse vehicle.

In some embodiments, the electrical system further includes multiple electric wires. In some embodiments, the electric wires are directly coupled to the refuse body such that the body assembly can be removed from the chassis without removing the electric wires from the refuse body.

In some embodiments, the hydraulic system further includes a packer manifold configured to direct pressurized hydraulic fluid to a packer of the refuse vehicle, and an arm manifold configured to direct pressurized hydraulic fluid to an arm of the refuse vehicle. In some embodiments, the packer manifold and the arm manifold are coupled to the refuse body such that the body assembly can be removed from the chassis without removing the arm manifold or the packer manifold from the refuse body.

In some embodiments, the self-contained body assembly further includes a pair of rails that extend along a bottom of the body assembly and multiple body mounts. In some embodiments, the body mounts are coupled with the pair of rails of the body assembly and configured to removably couple with the chassis. In some embodiments, the refuse body defines a refuse compartment for loading, storing, and discharging refuse.

In some embodiments, the electrical system further includes multiple accessories. In some embodiments, the accessories include at least one camera. In some embodiments, one or more communication wires extend between the body controller and the at least one camera through a cover that extends along an external surface of the refuse body.

In some embodiments, the self-contained body assembly is configured to pivotally couple with the chassis through a pivotal coupler at a rear end of the chassis. In some embodiments, the self-contained body includes lift cylinders positioned at a front end of the self-contained body assembly for driving the self-contained body assembly to pivot relative to the chassis about the pivotal coupler.

Another implementation of the present disclosure relates to a method for assembling and disassembling a refuse vehicle, according to some embodiments. In some embodiments, the method includes providing a body for the refuse vehicle, the body de-coupled from a chassis of the refuse vehicle. In some embodiments, the method also includes installing a hydraulic system onto the body, the hydraulic system including a hydraulic pump and a reservoir, the hydraulic pump and the reservoir. In some embodiments, the method includes installing an electrical system onto the body, the electrical system including a body controller and an electrical wire. In some embodiments, the method includes removably coupling the body with the hydraulic system and the electrical system installed onto the chassis. In some embodiments, the hydraulic system is operable and testable when the body is removed from the chassis and provided with an electrical power source.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes a self-contained body that includes a hydraulic system and an electrical system. The self-contained body is removably coupled with a chassis of the vehicle. The self-contained body can be removable from the chassis without requiring de-coupling of any hydraulic lines of the hydraulic system from a chassis, and without requiring any de-coupling of electrical wires of the electrical system from the chassis. Advantageously, the self-contained body can be fully assembled with appropriate hydraulic or electrical systems, tested without being coupled with the chassis, and then coupled onto the chassis after being fully assembled, configured, and tested.

Overall Vehicle

Figure 1:
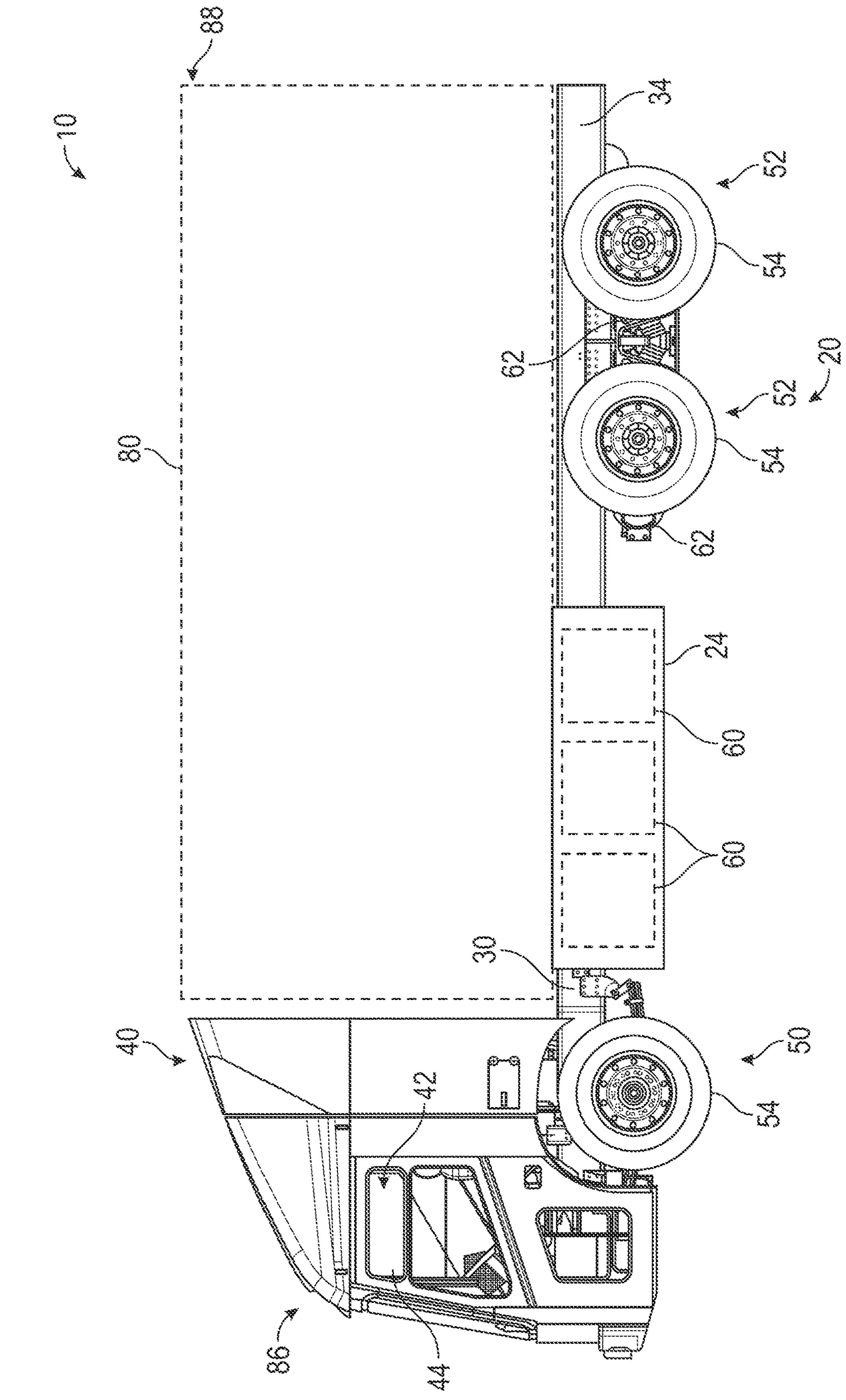
FIG. 1 is a left side view of a vehicle, according to an exemplary embodiment.
Figure 2:
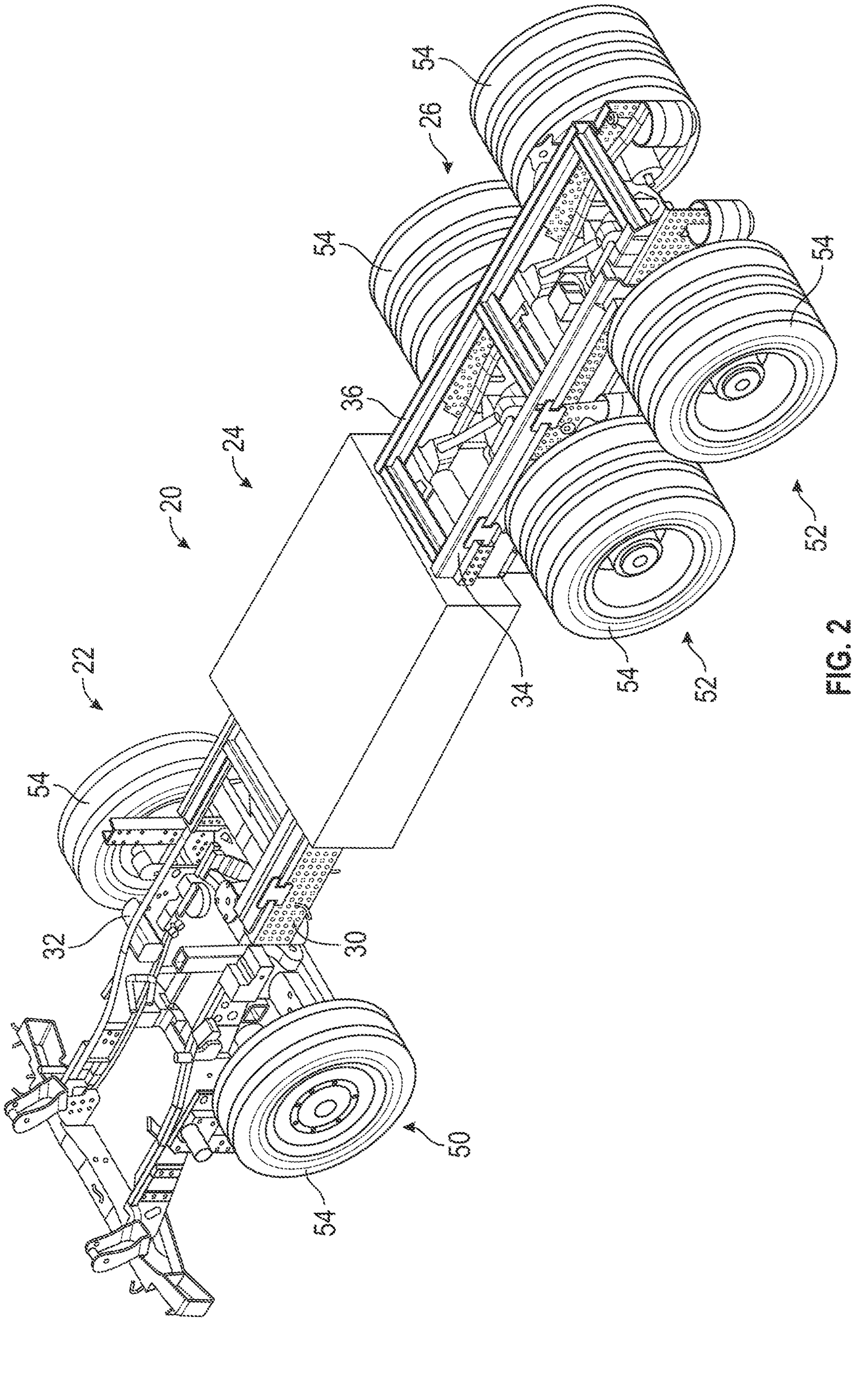
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

A. Front-Loading Refuse Vehicle

Figure 3:
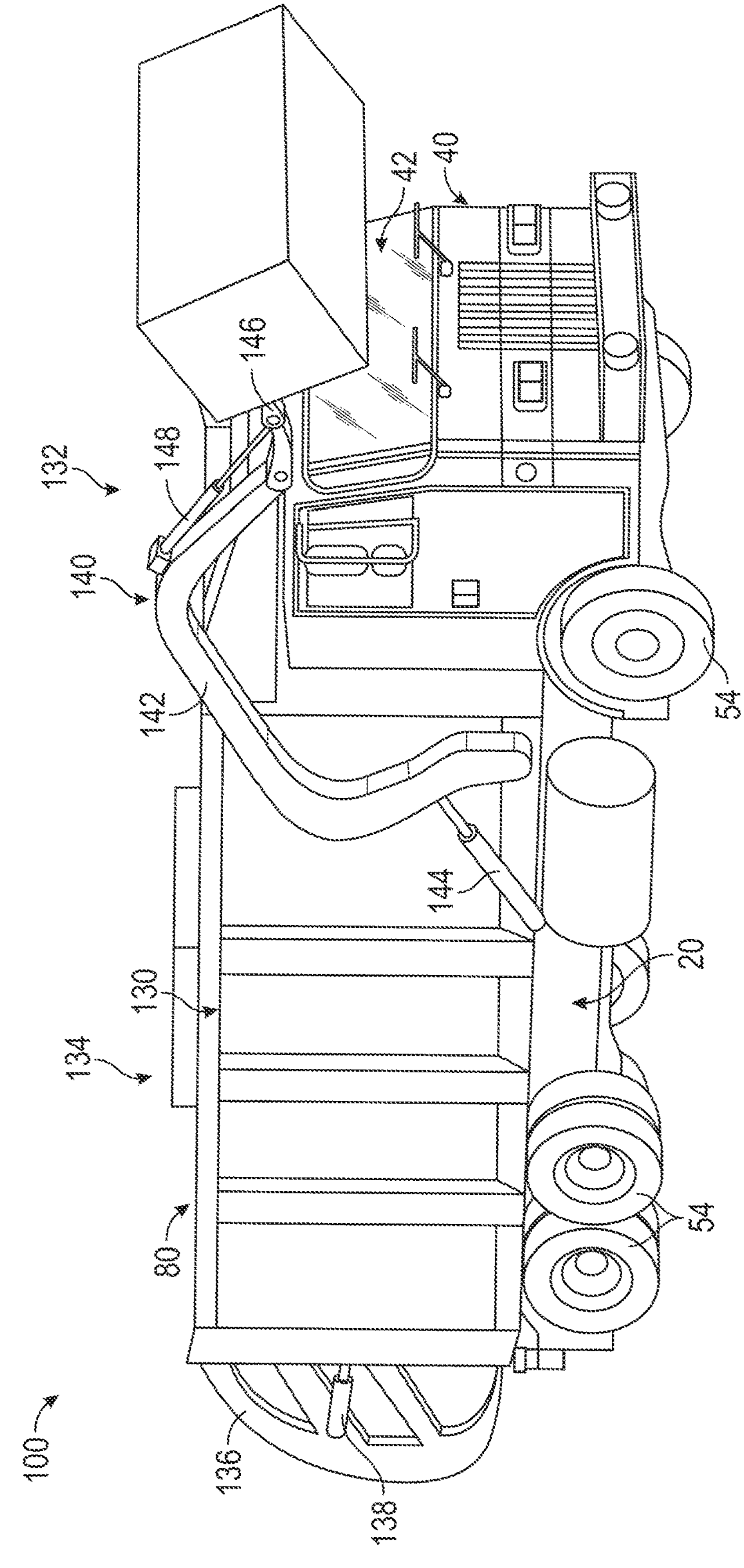
FIG. 3 is a perspective view of the vehicle of FIG. 1 configured as a front-loading refuse vehicle, according to an exemplary embodiment.
Figure 4:
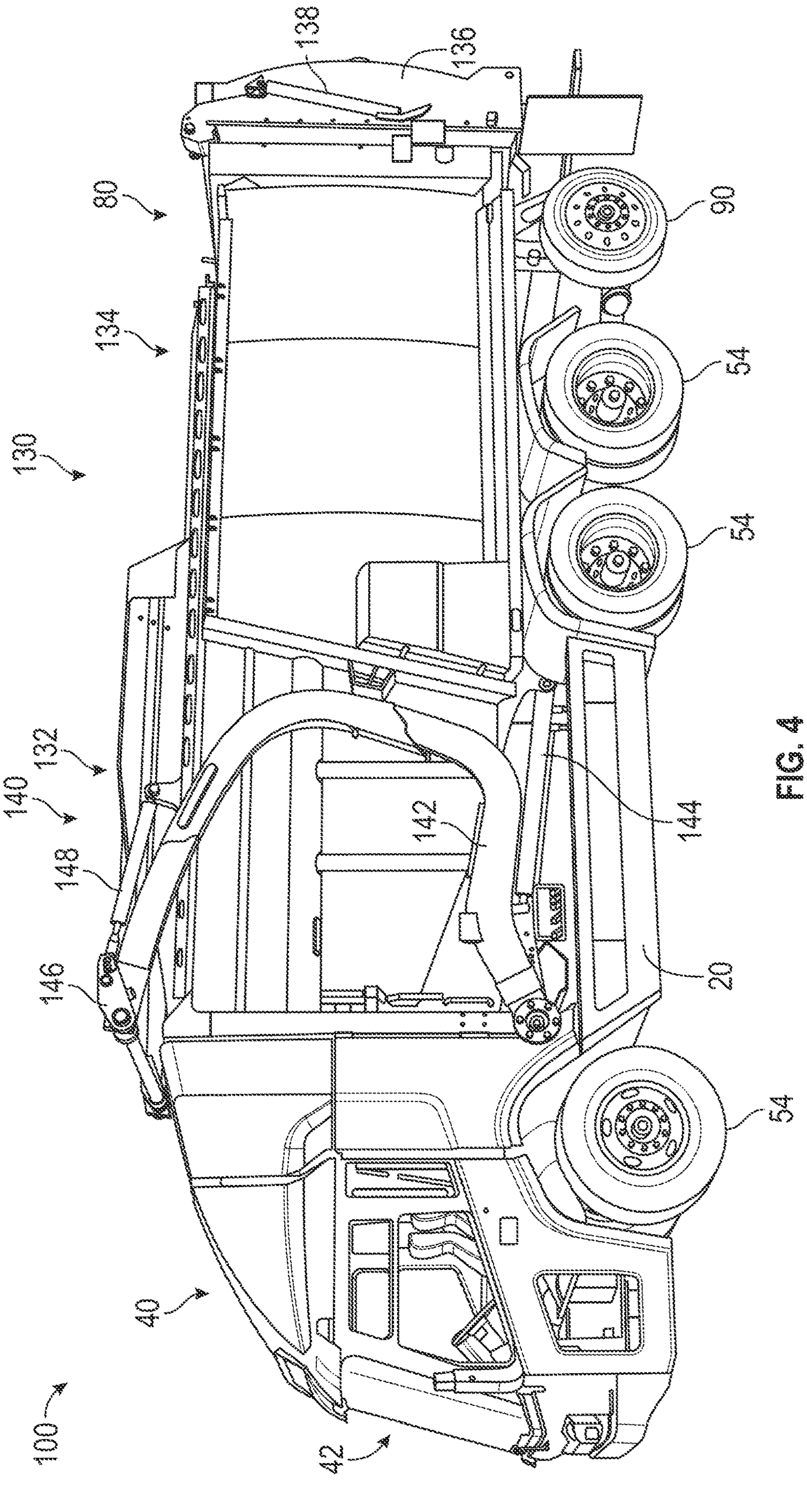
FIG. 4 is a right side view of the front-loading refuse vehicle of FIG. 3.
Figure 5:
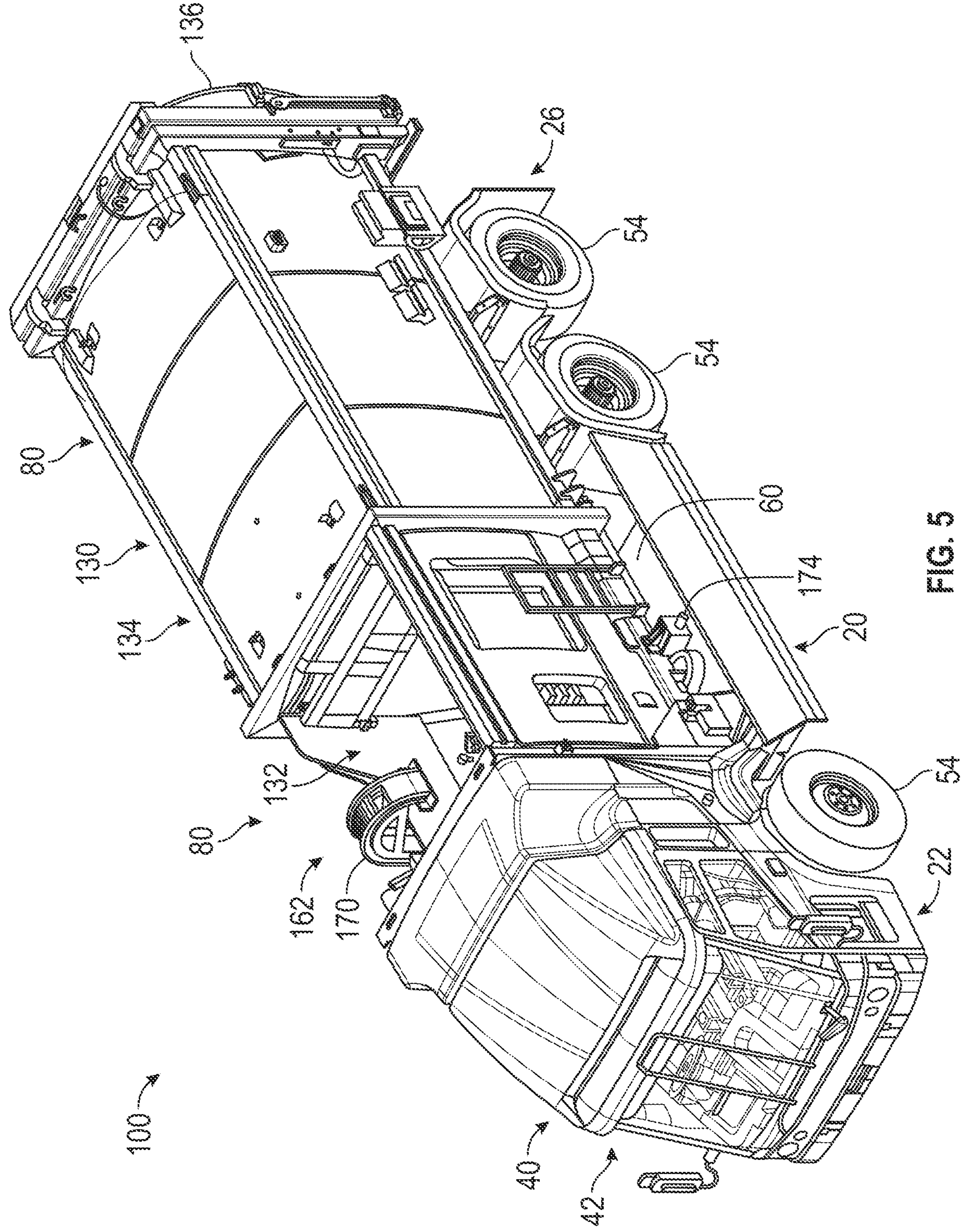
FIG. 5 is a top view of the front-loading refuse vehicle of FIG. 3

Referring now to FIGS. 3-5, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

As shown in FIG. 3, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIG. 3, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIG. 3, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 6:
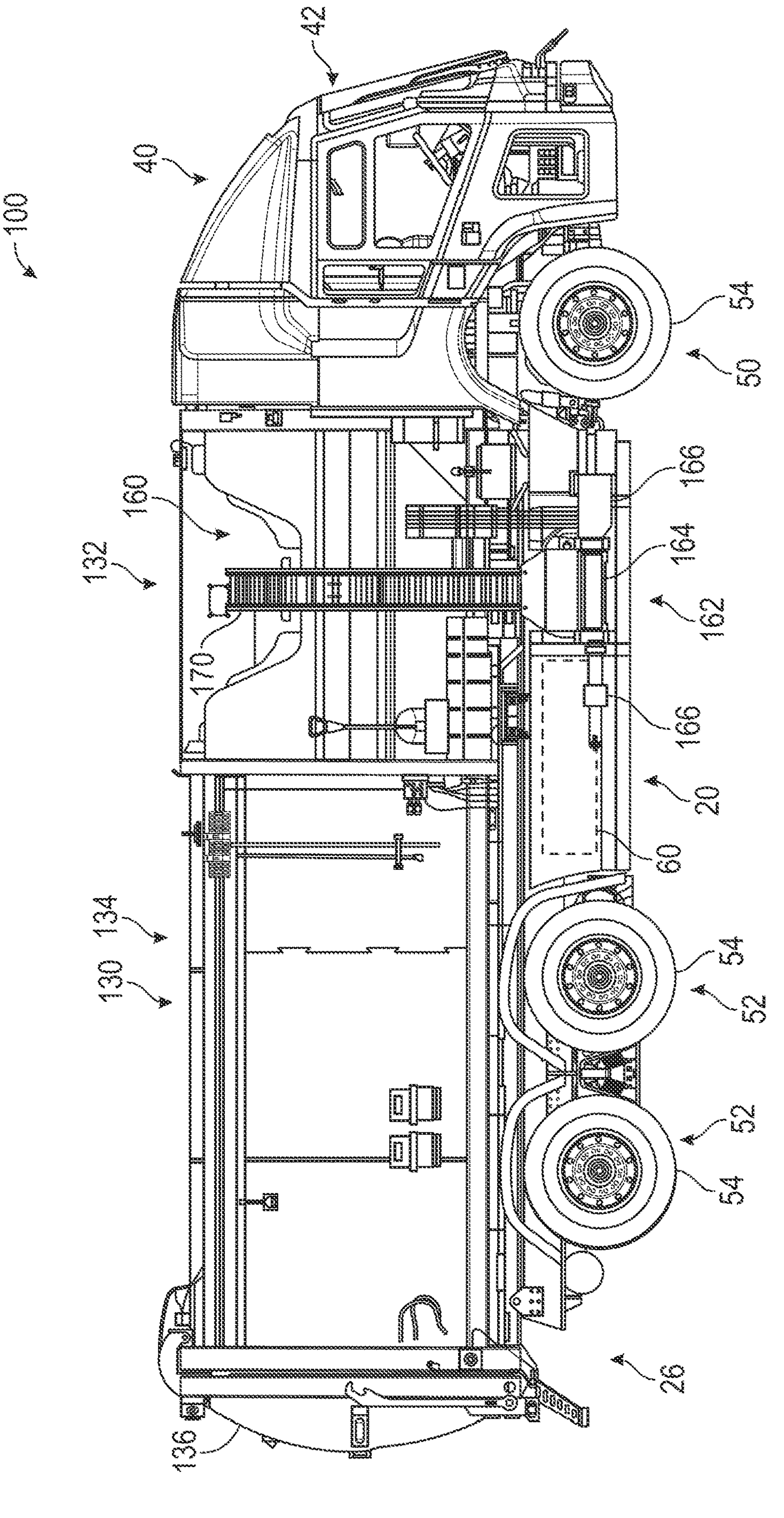
FIG. 6 is a perspective view of the vehicle of FIG. 1 configured as a side-loading refuse vehicle, according to an exemplary embodiment.
Figure 7:
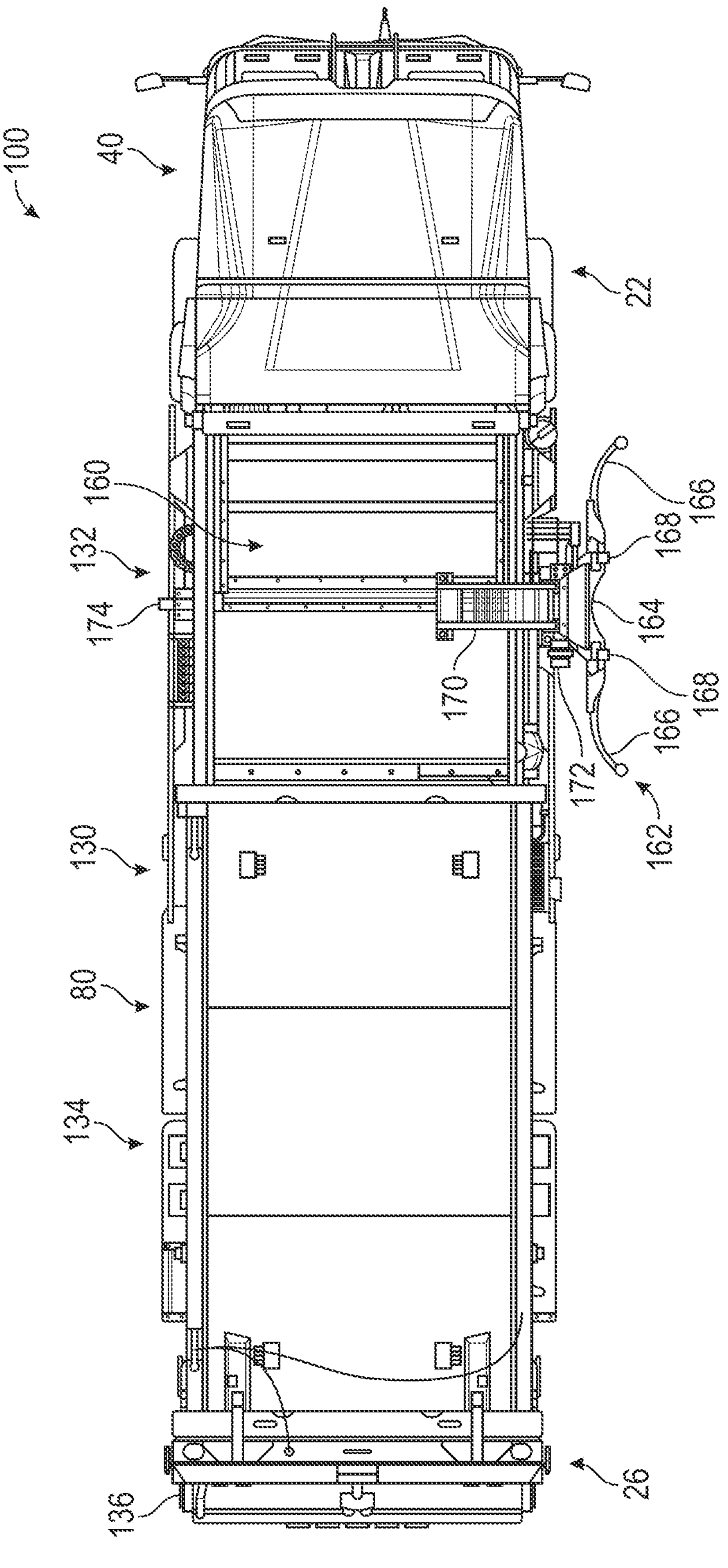
FIG. 7 is a right side view of the side-loading refuse vehicle of FIG. 6.
Figure 8:
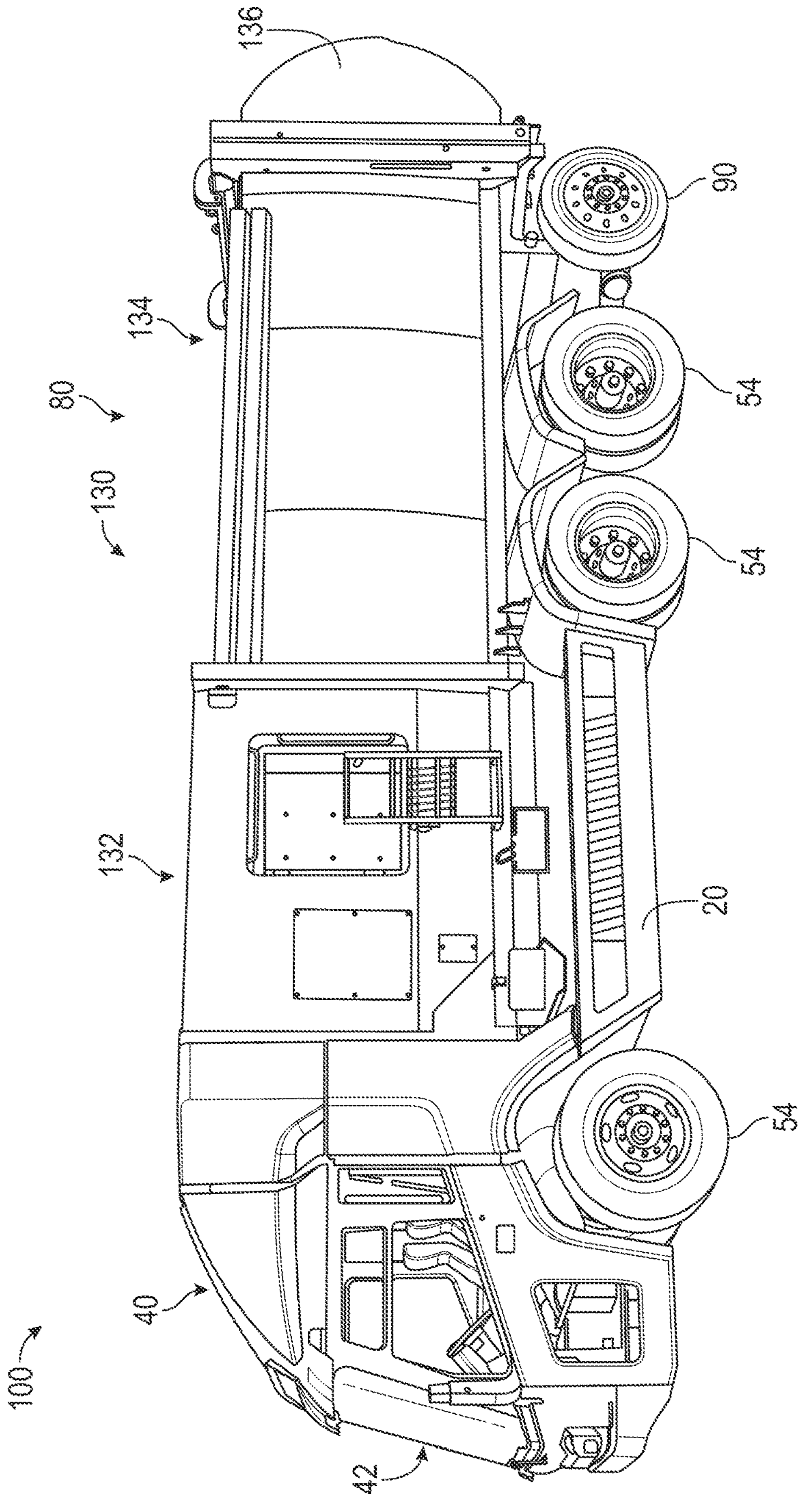
FIG. 8 is a top view of the side-loading refuse vehicle of FIG. 6.

Referring now to FIGS. 6-8, an alternative configuration of the refuse vehicle 100 is shown according to an exemplary embodiment. Specifically, the refuse vehicle 100 of FIGS. 6-8 is configured as a side-loading refuse vehicle. The refuse vehicle 100 of FIGS. 6-8 may be substantially similar to the front-loading refuse vehicle 100 of FIGS. 3-5 except as otherwise specified herein.

Referring still to FIGS. 6-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
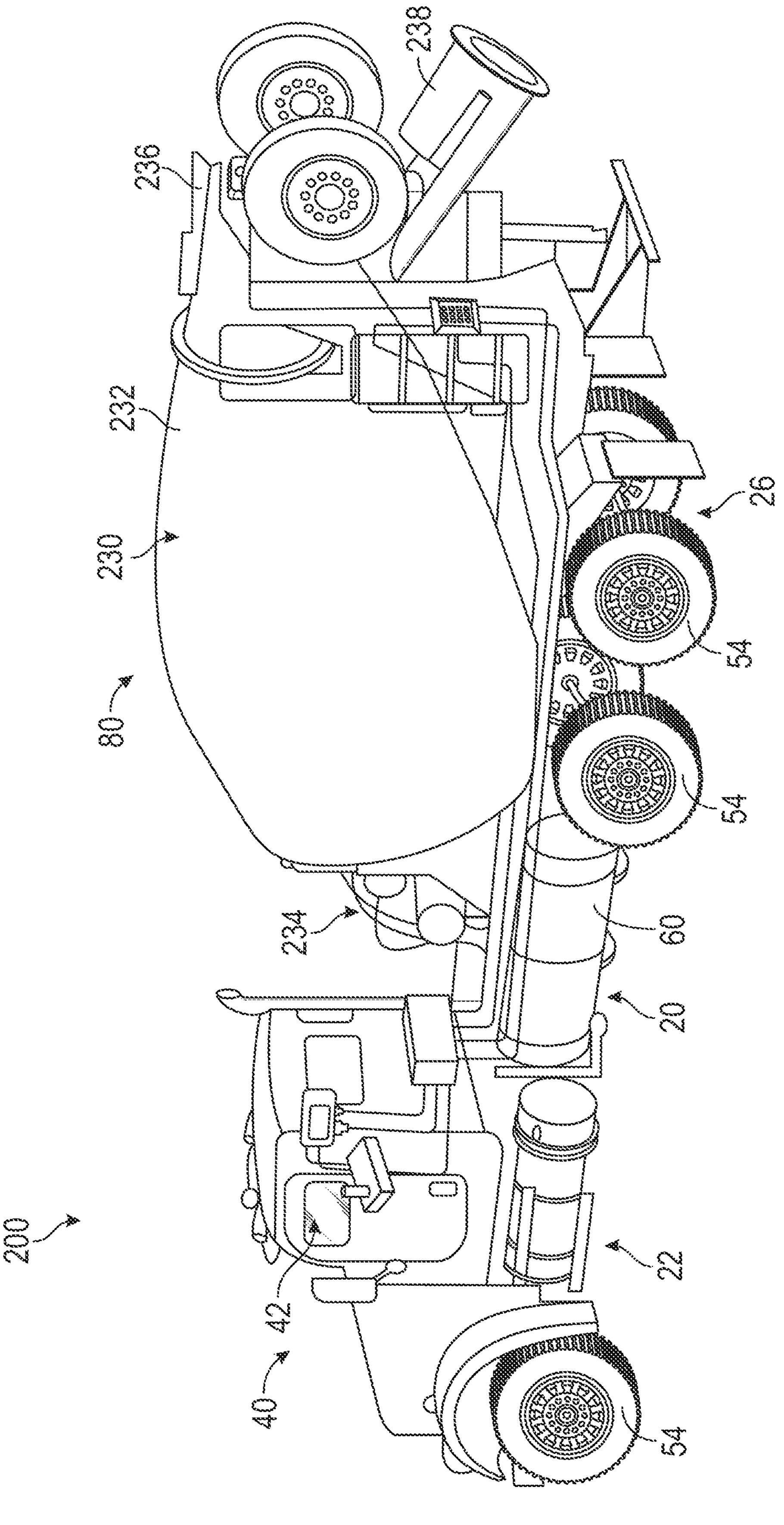
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves)

including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
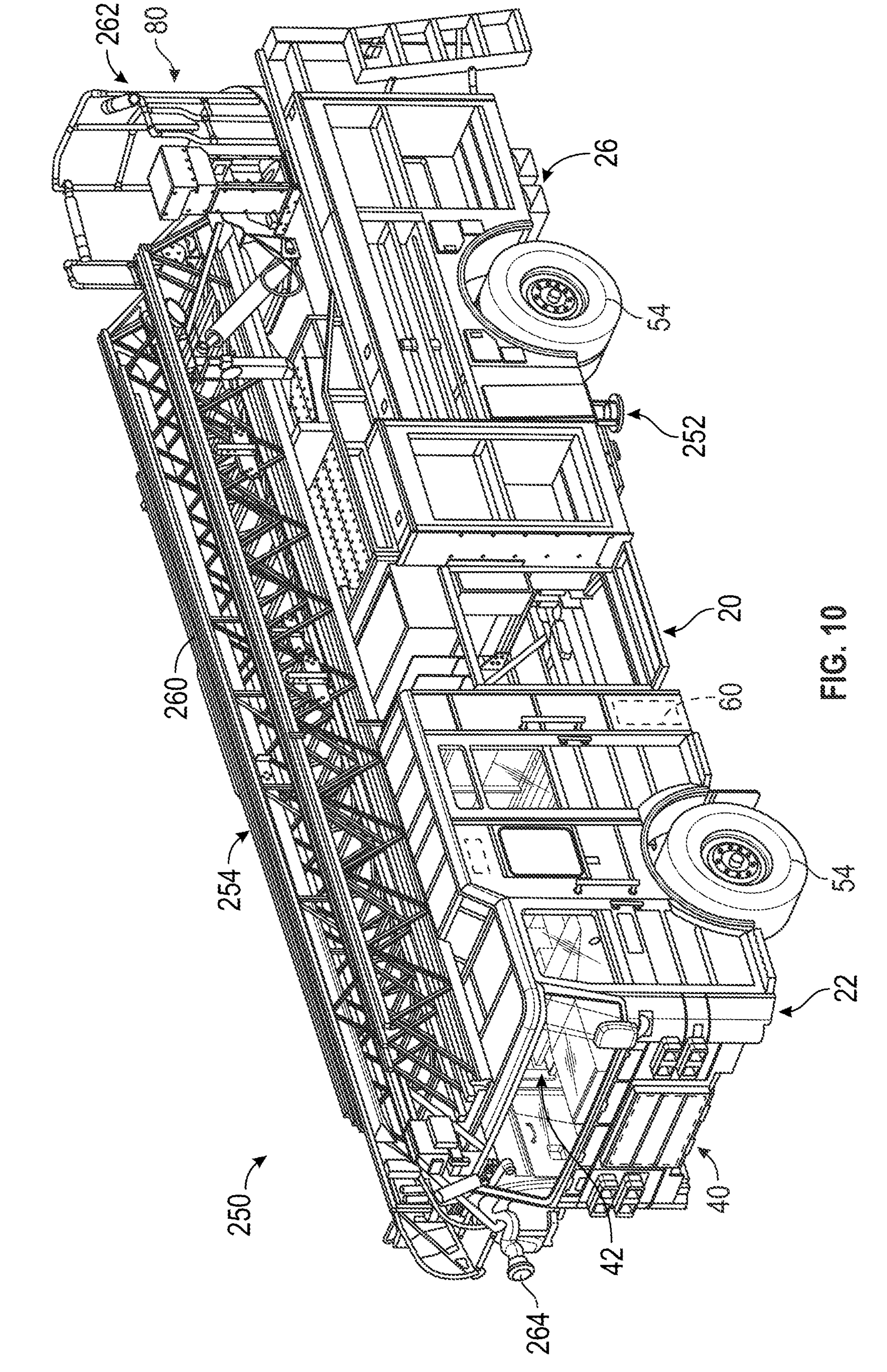
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
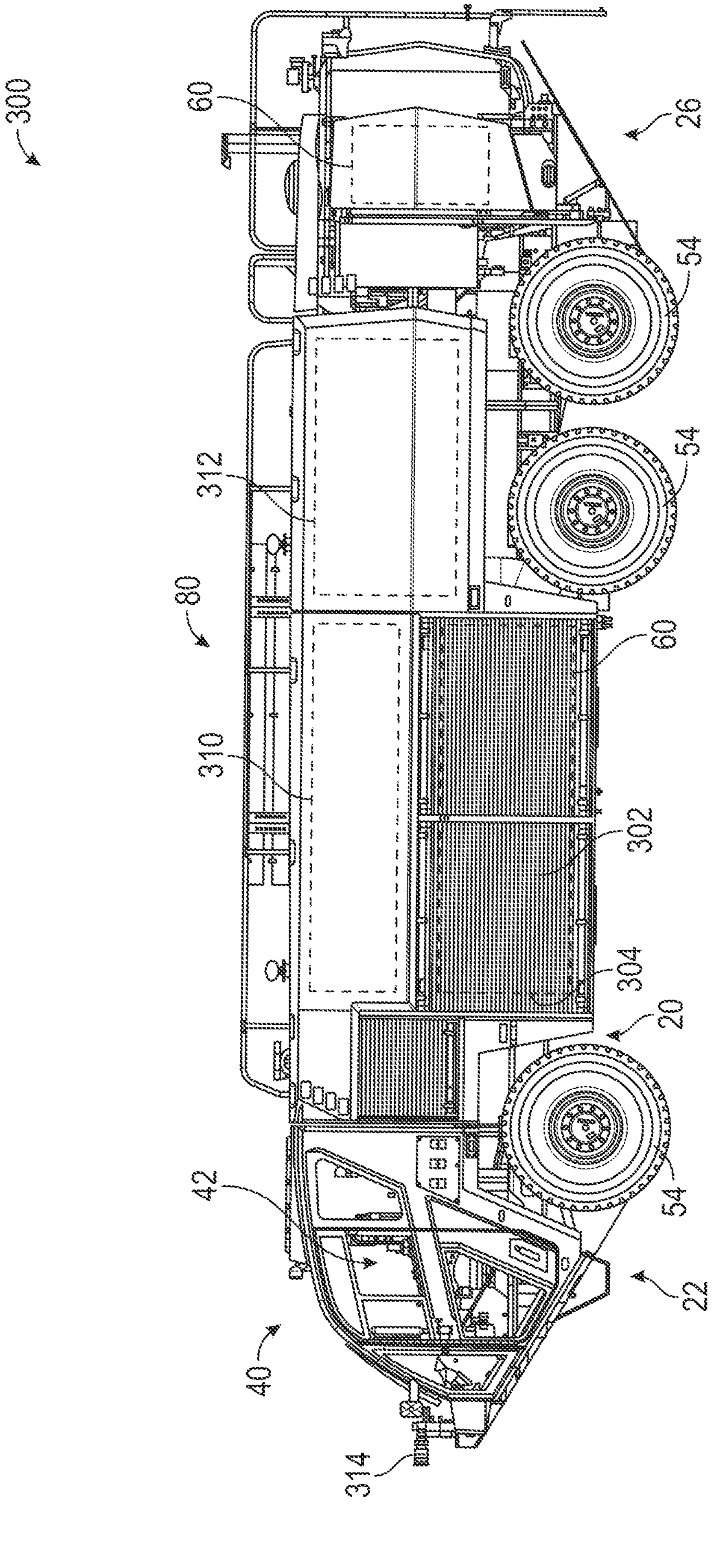
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
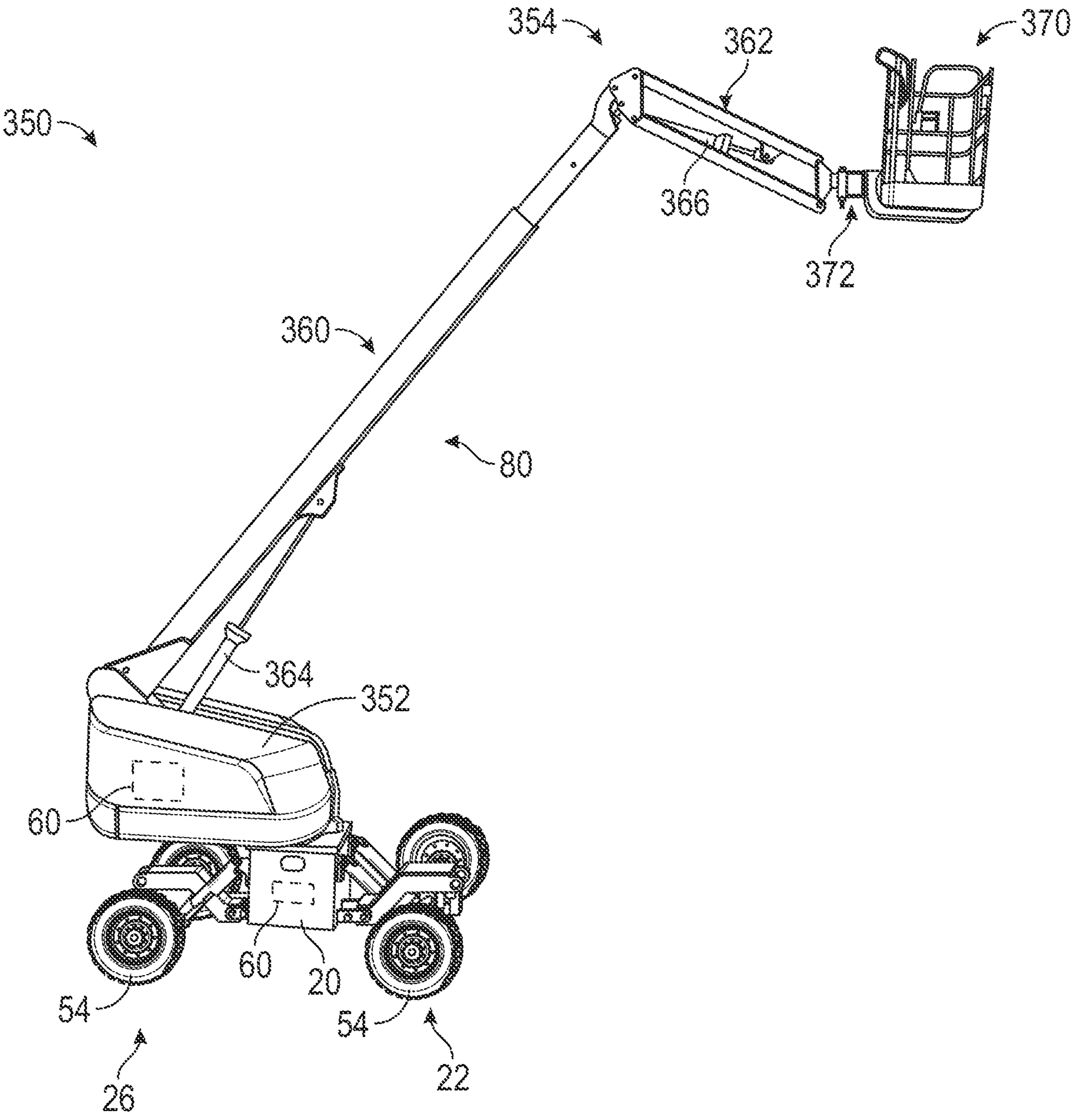
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
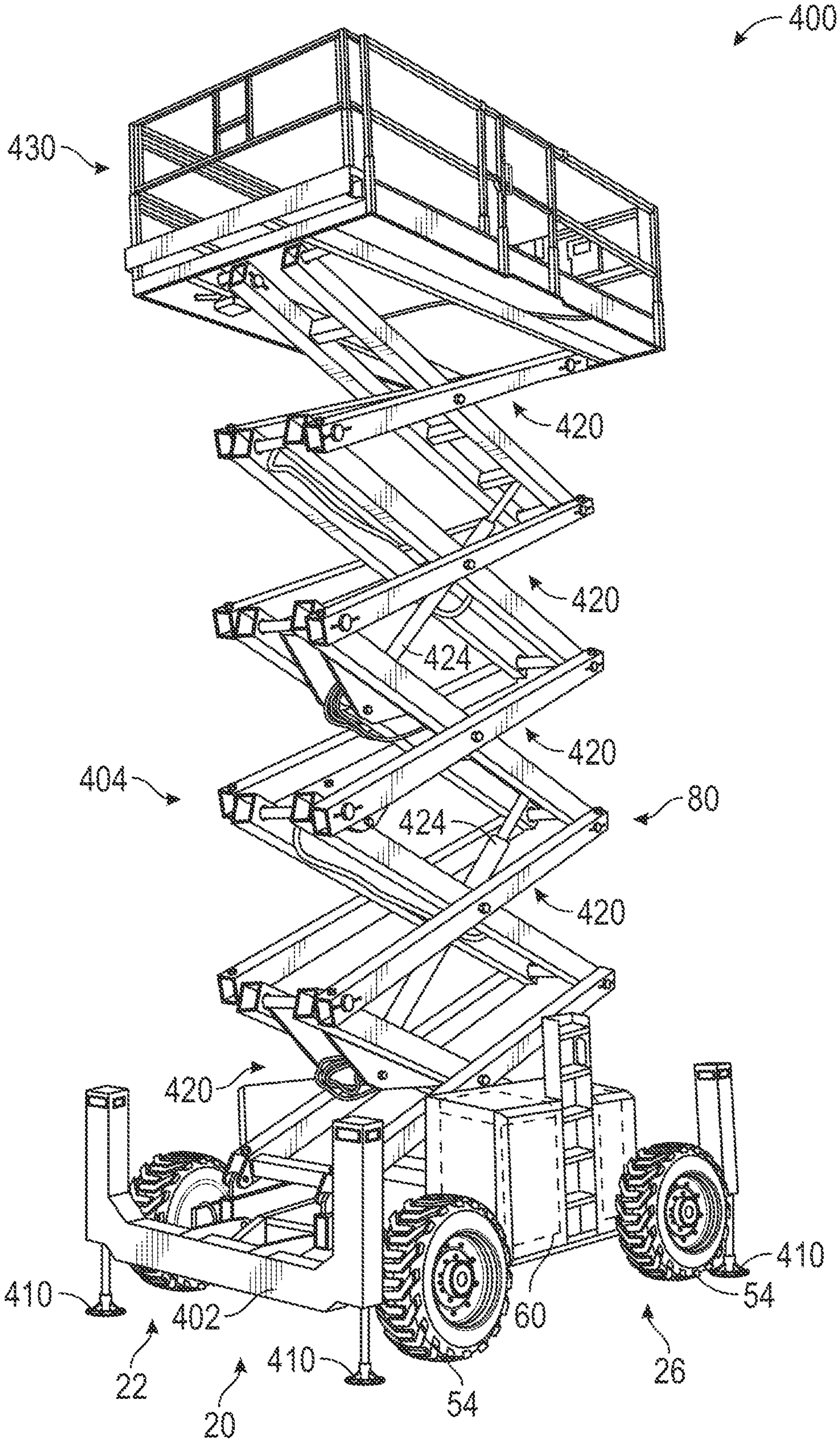
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Self-Contained Body

Overview

Referring to FIGS. 14-28, the refuse vehicle 100 can have a self-contained body (e.g., the application kit 80), shown as self-contained body 800 (e.g., a body, a body assembly, a body system, etc.). The self-contained body 800 can be similar to the application kit 80, but may include different systems, or systems configured differently so that the self-contained body 800 can be assembled without being coupled with the chassis 20. The self-contained body 800 can be tested off of the chassis 20 (e.g., if provided with appropriate power such as DC power, CAN data/signals, and power for inverters and electric motors of a coolant system). The self-contained body 800 may include hydraulic pumps that are located on the body 800 as opposed to on the chassis 20 to facilitate off-chassis testing and configuration. In particular, the self-contained body 800 can include hydraulic reservoirs, control modules, hydraulic pumps, batteries, etc., all positioned (e.g., fixedly coupled) on the body 800 instead of on the chassis 20. Advantageously, off-chassis testing of the self-contained body 800 would not be possible for a conventional body, since certain components would be installed on the chassis 20. In some embodiments, if the refuse vehicle 100 is a fully-electric refuse vehicle, the batteries for the vehicle are positioned on the self-contained body 800 as well.

Hydraulic System

Figure 14:
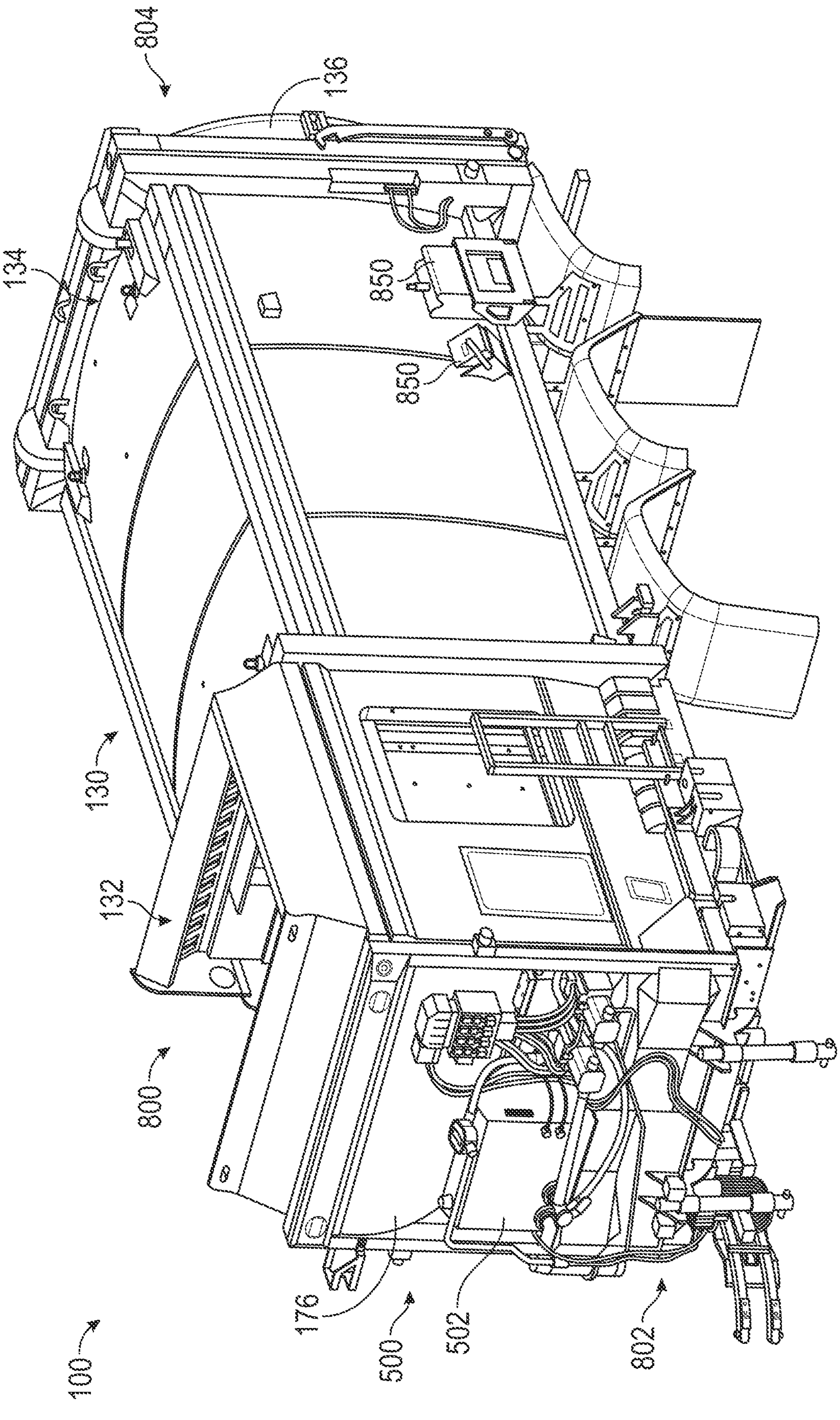
FIG. 14 is a perspective view of a self-contained body, according to an exemplary embodiment.

Referring to FIG. 14, the self-contained body 800 includes a hydraulic system 500 that is positioned on a front end 802 of the self-contained body 800. The hydraulic system 500 can be fixedly coupled with the front end 802 of the self-contained body 800, between the self-contained body and the cab 40. In some embodiments, the hydraulic system 500, or some of the components of the hydraulic system 500 are positioned directly behind the cab 40. In some embodiments, the hydraulic system 500 or portions of the hydraulic system 500 are positioned on a front wall of a hopper 176 that defines the hopper volume 132.

Figure 16:
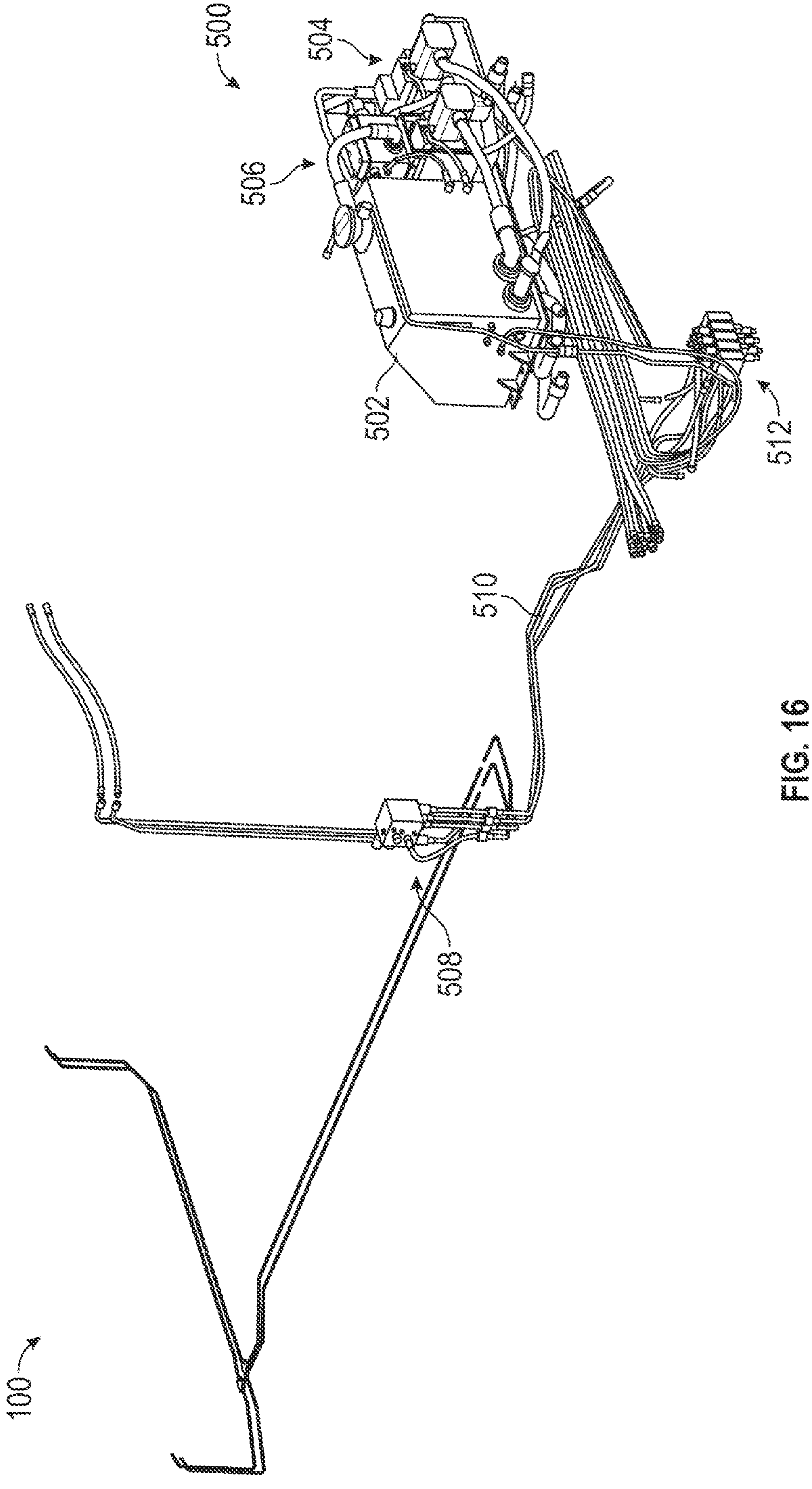
FIG. 16 is a perspective view of a hydraulic system of the self-contained body of FIG. 14, according to an exemplary embodiment.

Referring to FIGS. 14 and 16, the hydraulic system 500 includes a tank, a reservoir, a container, etc., shown as hydraulic reservoir 502, a pack manifold 506 (e.g., a packer manifold for a packer or compaction apparatus), multiple pumps and motors, shown as hydraulic pumps 504, an arm manifold 512, a door/tailgate manifold 508, and conduits 510 (e.g., tubular members, pipes, hoses, fittings, hydraulic lines, etc.). The hydraulic pumps 504 can include a pair of electric motors and pumps that are driven by the electric motors. In some embodiments, the electric motors consume electrical energy from the batteries 60. The hydraulic pumps 504 pressurize the hydraulic fluid for use by different hydraulic components of the refuse vehicle 100. The hydraulic reservoir 502 is configured to store hydraulic fluid so that the hydraulic fluid can be pressurized by the hydraulic pumps 504, driven through the hydraulic circuit, and returned to the hydraulic reservoir 502.

The pack manifold 506 is configured to receive some of the hydraulic fluid from the hydraulic pumps 504, and redirect hydraulic fluid to a compaction apparatus of the refuse vehicle 100. In some embodiments, the pack manifold 506 includes different valves and internal channels to selectively redirect some of the pressurized hydraulic fluid to the compaction apparatus. The pack manifold 506 can be operated by a controller so that when an operator provides a command to operate the compaction apparatus, the pack manifold 506 redirects some of the pressurized hydraulic fluid to the compaction apparatus. In some embodiments, the pack manifold 506 is configured to receive the pressurized hydraulic fluid from an outlet of the hydraulic pumps 504 via the conduits 510.

The arm manifold 512 is configured to receive pressurized hydraulic fluid from the hydraulic pumps 504 and redirect some of the pressurized hydraulic fluid to a hydraulic component (e.g., a hydraulic actuator) of the lift assembly 160, the grabber assembly 162, the finger actuators 168, the lift actuator 172, etc. In some embodiments, the arm manifold 512 is the same as or similar to the pack manifold 506, and is configured to receive signals from the controller and operated based on the signals from the controller. In some embodiments, the arm manifold 512 is fluidly coupled with the outlet of the hydraulic pumps 504 via conduits 510.

The door/tailgate manifold 508 is configured to redirect some of the pressurized hydraulic fluid from the hydraulic pumps 504 to a hydraulic component of the tailgate 136 (e.g., the tailgate actuator 138) and/or a top door of the body 800. In some embodiments, the door/tailgate manifold 508 is fluidly coupled with the outlet of the hydraulic pumps 504 via conduits 510. The door/tailgate manifold 508 can be communicably coupled with the controller so that the controller or operator of the refuse vehicle 100 can operate the door/tailgate manifold 508 and thereby operate the tailgate 136.

In some embodiments, the conduits 510, the door/tailgate manifold 508, the arm manifold 512, the hydraulic reservoir 502, the pack manifold 506, the hydraulic pumps 504, etc., are all fixedly coupled or mounted on the self-contained body 800 so that the self-contained body 800 can be fully assembled without requiring coupling on the chassis 20. In some embodiments, the hydraulic reservoir 502, the pack manifold 506, the hydraulic pumps 504, and the arm manifold 512 are positioned on the front 802 of the body 800, between the self-contained body 800 and the cab 40.

Figure 15:
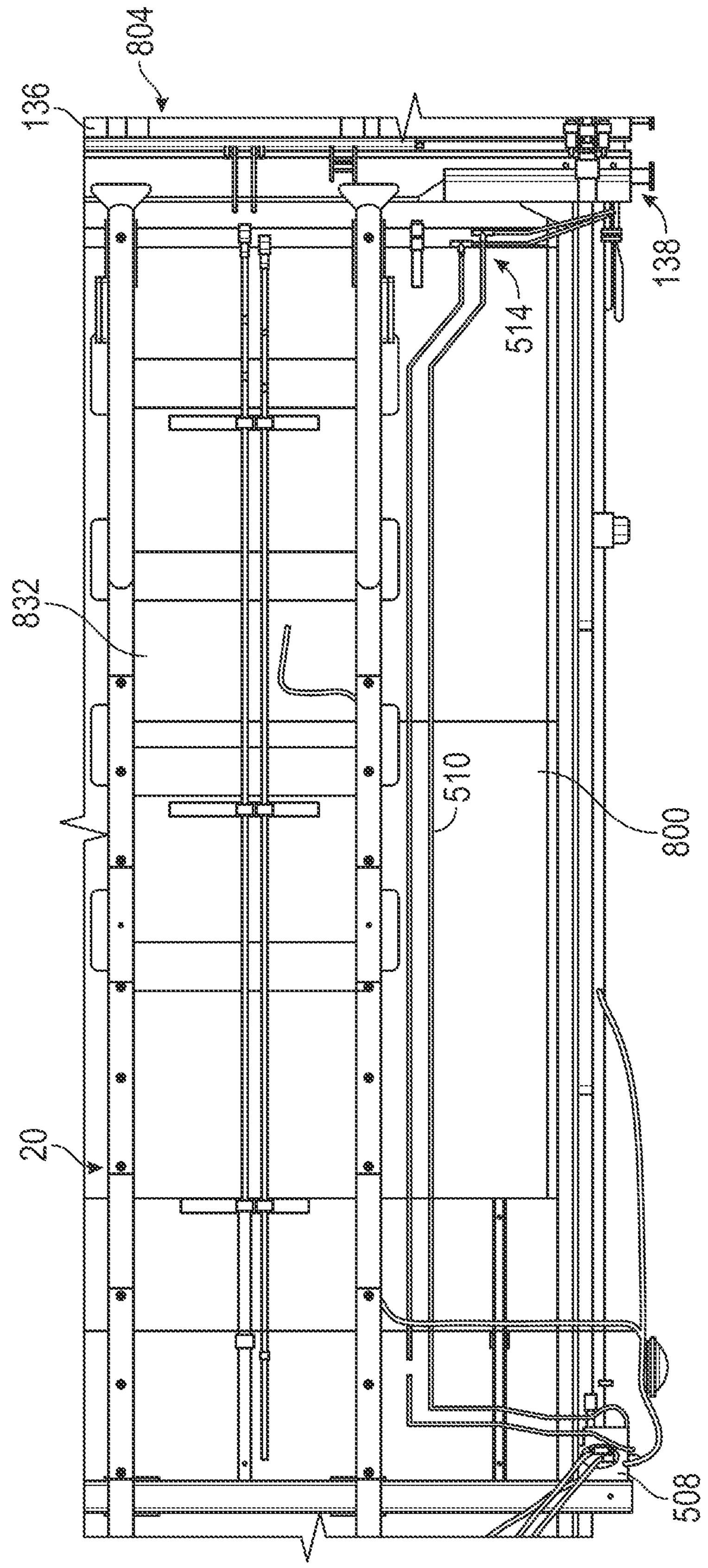
FIG. 15 is a view of an underside of the self-contained body of FIG. 14, according to an exemplary embodiment.

Referring to FIG. 15, the routing of the conduits 510 to the tailgate actuators 138 is shown. FIG. 15 shows an underside 832 of the body 800 and the chassis 20. The conduits 510 are coupled with the body 800 on the underside 832 (e.g., a bottom) of the body 800, and extend from a front of the body 800 to the rear 804 of the body 800 proximate the chassis 20. The conduits 510 may include tee connectors 514 that divert portions of the pressurized hydraulic fluid to the tailgate actuators 138 on either side of the tailgate 136.

Figure 17:
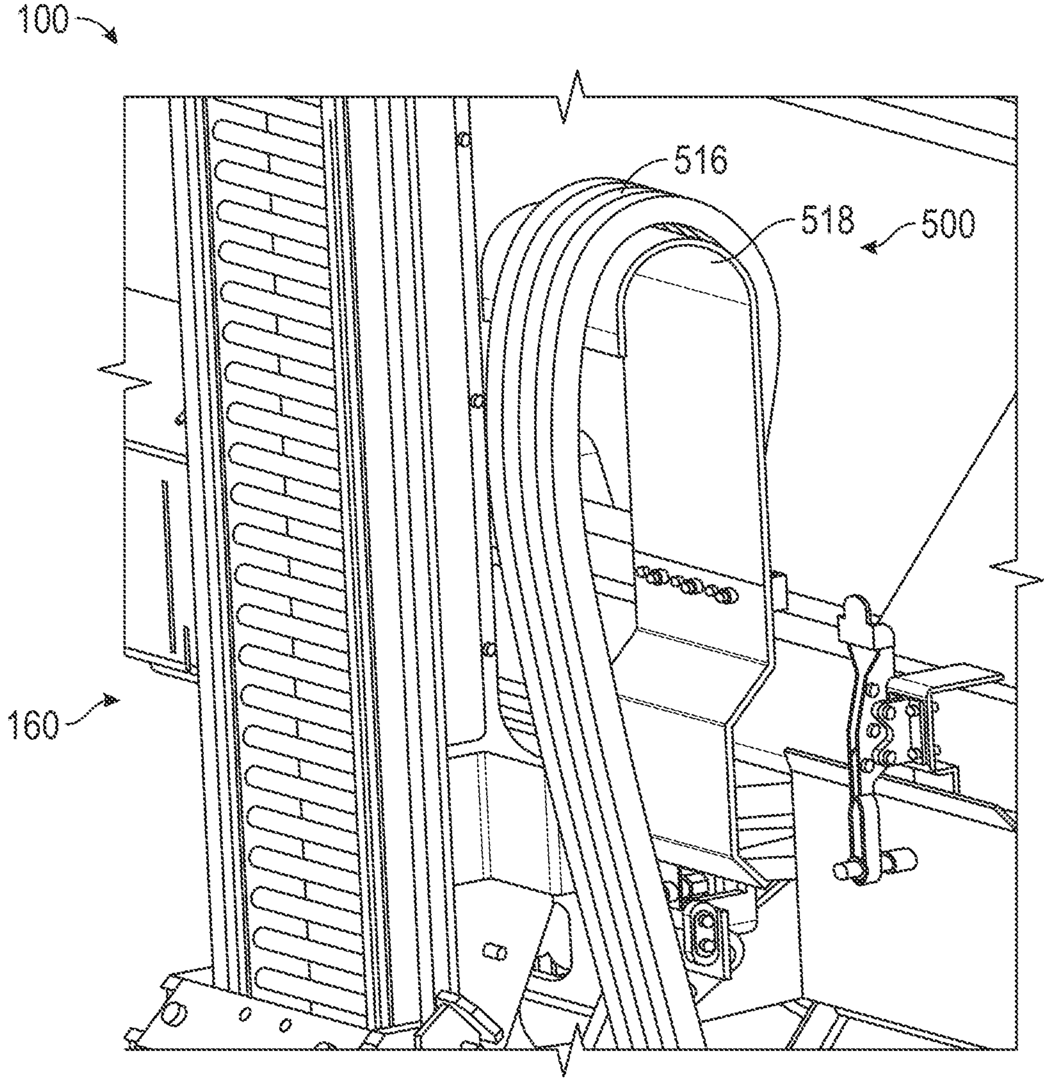
FIG. 17 is a perspective view of an arm loading portion of the hydraulic system of FIG. 16, according to an exemplary embodiment.
Figure 18:
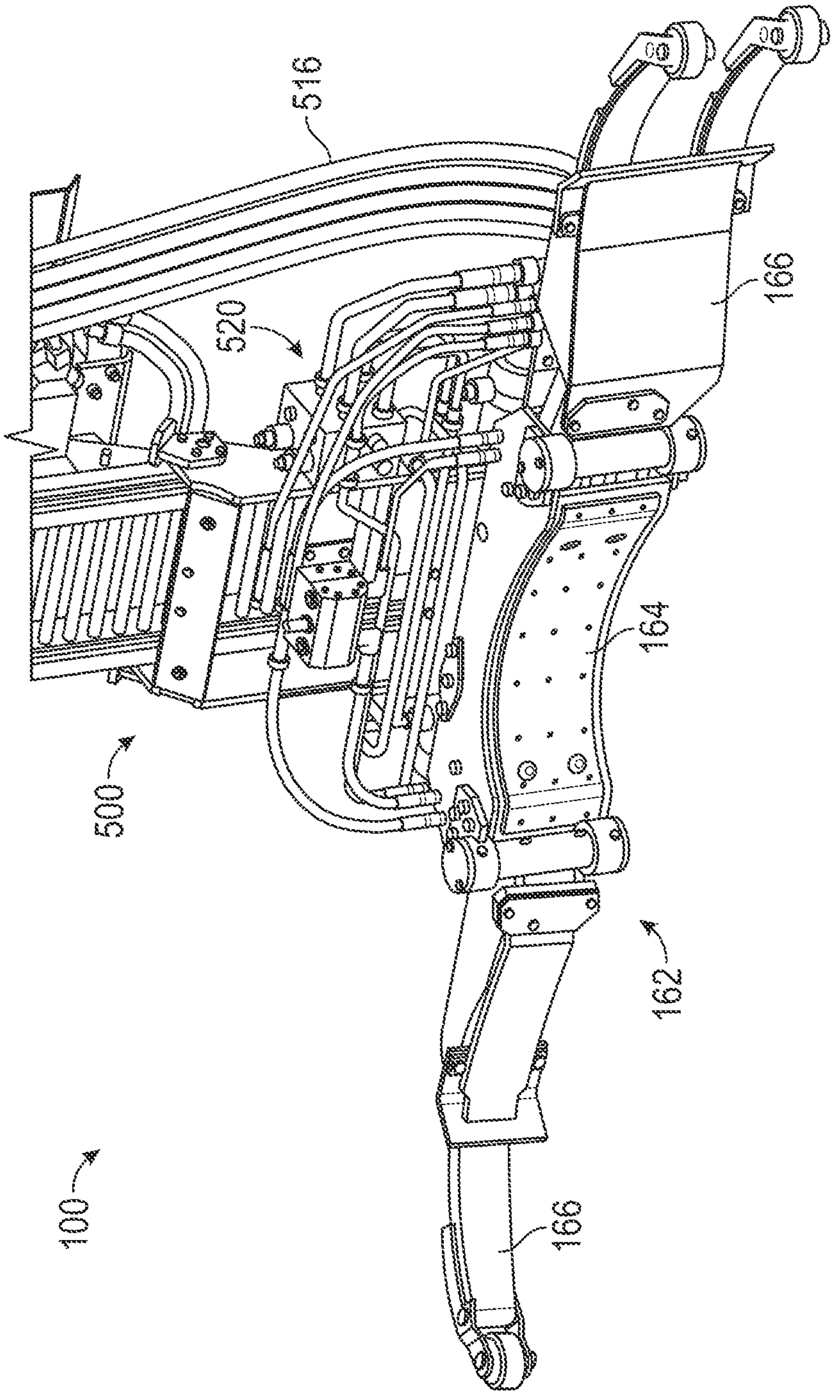
FIG. 18 is a perspective view of another arm loading portion of the hydraulic system of FIG. 16, according to an exemplary embodiment.

Referring to FIGS. 17 and 18, routing of the conduits 510 for the lift assembly 160 and the grabber assembly 162 is shown. The conduits 510 include flexible conduits 516 that provide hydraulic fluid from the arm manifold 512 to the lift assembly 160 and the grabber assembly 162, or more specifically, to hydraulic components (e.g., actuators) of the lift assembly 160 and the grabber assembly 162 such as the track actuator 174, the finger actuators 168 (shown in FIG. 7), etc. The lift assembly 160 can use the pressurized hydraulic fluid provided by the hydraulic pumps 504 (e.g., from the arm manifold 512) to drive the grabber assembly 162 to ascend or descend a track. The flexible conduits 516 can be routed along a frame 518 that has an arcuate shape, down to the main body 164 of the grabber assembly 162. The conduits 510 also include hardline conduits 520 that are coupled with the main body 164 of the grabber assembly 162. The hardline conduits 520 are configured to provide or distribute pressurized hydraulic fluid to the hydraulic components of the grabber assembly 162 and/or the lift assembly 160 so that the hydraulic components of the grabber assembly 162 and/or the lift assembly 160 can use the pressurized hydraulic fluid to operate.

Headframe

Figure 19:
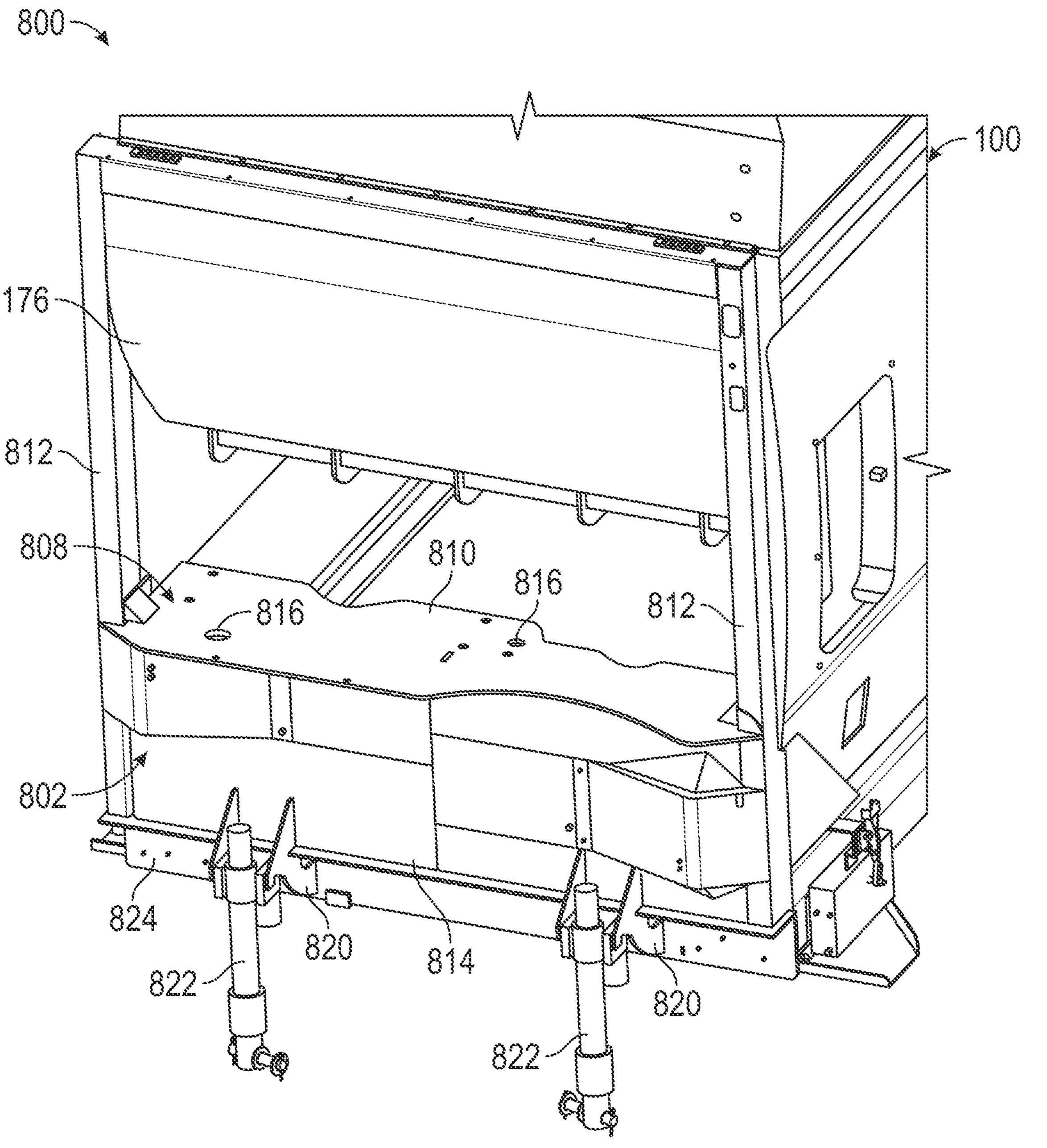
FIG. 19 is a perspective view of a front end of the self-contained body of FIG. 14, according to an exemplary embodiment.

Referring to FIG. 19, a headframe 814 (e.g., a front wall, a front face, a front structure) of the self-contained body 800 at the front end 802 of the body 800 defines a shelf 808 upon which various components of the refuse vehicle 100 can be positioned. In some embodiments, the hydraulic reservoir 502, the pack manifold 506, and the hydraulic pumps 504 are positioned on the shelf 808. The shelf 808 (e.g., mounting point, support structure, etc.) includes a surface 810 (e.g., a plate, a face, etc.) that can include openings, mounting points, structure, hooks, interlocking members, etc., shown as mounting points 816 for coupling the hydraulic reservoir 502, the pack manifold 506, or the hydraulic pumps 504 on the shelf 808. The shelf 808 may be defined between a pair of vertical members 812 that extend from a floor 824 of the body 800 to a roof of the body 800.

The self-contained body 800 includes mounts 820 for body lift actuators 822 to couple with the body 800. The mounts 820 are fixedly coupled with both the floor 824 and the headframe 814. The body lift actuators 822 are configured to pivotally couple with the mounts 820 at one end, and pivotally couple with the chassis 20 at an opposite end to thereby drive the body 800 to raise or lower.

Figure 20:
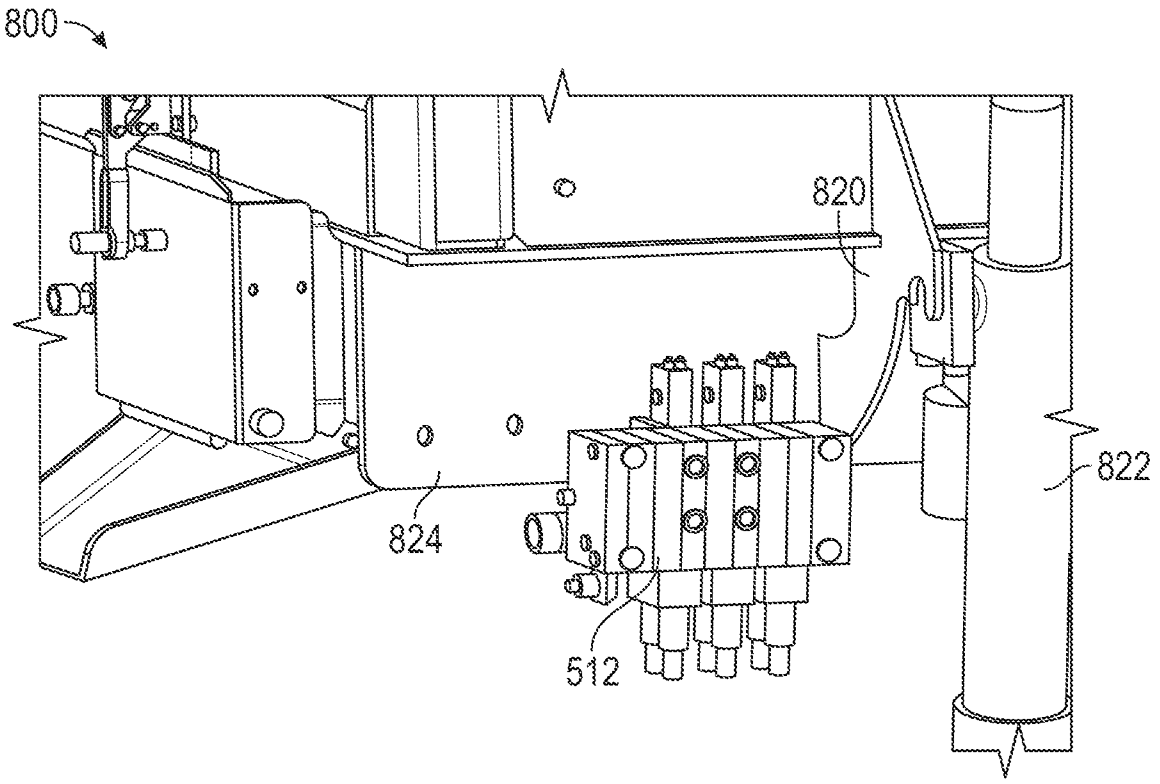
FIG. 20 is a perspective view of a portion of the front end of the self-contained body of FIG. 14, according to an exemplary embodiment.

Referring to FIG. 20, the arm manifold 512 may be positioned on the front end 802 of the floor 824. In some embodiments, the floor 824 includes a cut-out portion or volume configured to receive the arm manifold 512. The arm manifold 512 may be coupled with the floor 824 at the front end 802 of the body 800. In some embodiments, the arm manifold 512 is positioned proximate one of the lift actuators 822.

Figure 21:
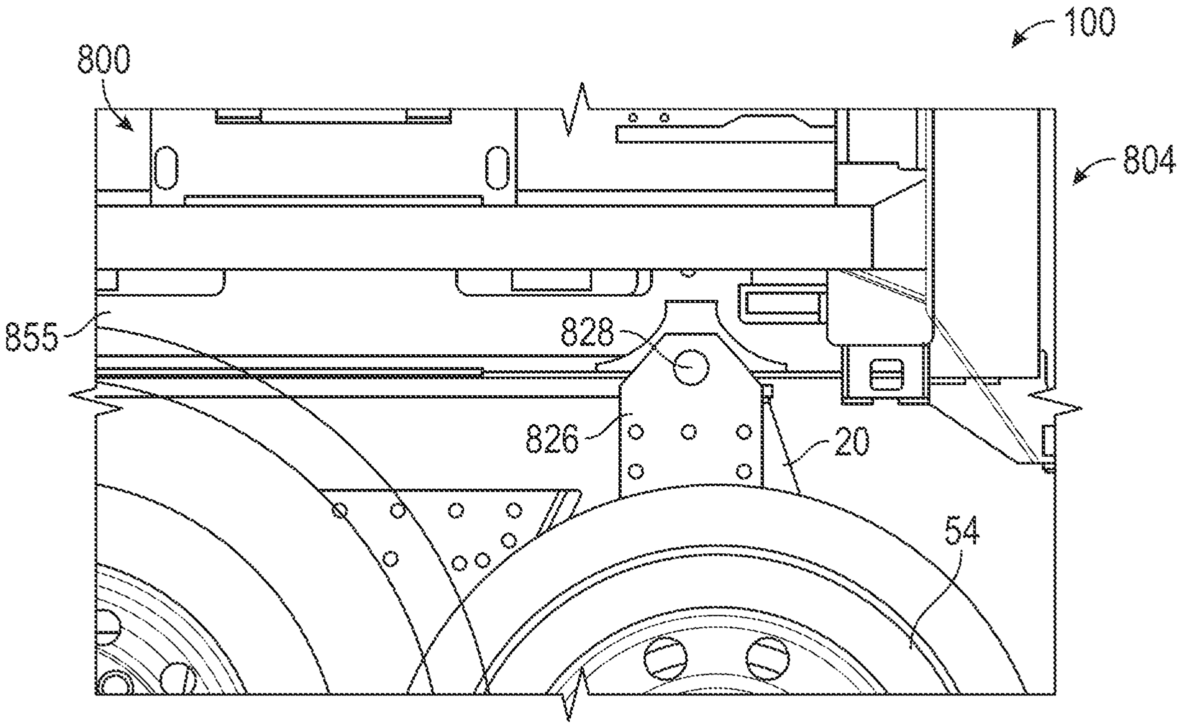
FIG. 21 is a side view of a pivot point of the self-contained body of FIG. 14, according to an exemplary embodiment.

Referring to FIG. 21, the body 800 can be configured to be pivoted relative to the chassis 20 (e.g., due to operation of the body lift actuators 822). In some embodiments, the chassis 20 includes a pivot mount 826. The pivot mount 826 can be positioned above at least one of the wheel assemblies 54, according to some embodiments. In some embodiments, the pivot mount 826 is positioned rearward of the wheel assemblies 54. In some embodiments, the pivot mount 826 is fixedly coupled with the chassis 20 and extends upwards towards the self-contained body 800. The body 800 also includes a pivot member 828 (e.g., a pivotal coupler) that is configured to be received within a corresponding opening of the pivot mount 826. The pivot member 828 can have a circular or pin shape that extends through the opening in the pivot mount 826 so that the body 800 is pivotally or rotatably coupled with the chassis 20 and can be driven to rotate relative to the chassis 20 about an axis at the pivot member 828. It should be understood that FIG. 21 shows only one side of the refuse vehicle 100, but the other side of the refuse vehicle 100 can have a similar pivotal coupling between the body 800 and the chassis 20. Embodiments or configurations of the refuse vehicle 100 that have side-loading arms (e.g., as shown in FIGS. 5-7) and embodiments or configurations of the refuse vehicle 100 that have front-end loading arms (e.g., as shown in FIGS. 3-4) can have the same pivotal coupling as shown in FIG. 21 so that the body 800 is configured to pivot relative to the chassis 20 at a same location along the chassis 20. In this way, the pivot point of the body 800 relative to the chassis 20 may be universal for all different loading configurations of the refuse vehicle 100. For example, the self-contained body 800 may be removed and replaced with a different self-contained body that has a different loading configuration, on the same chassis 20. In this way, the chassis 20 can be universal, and the configuration of the refuse vehicle 100 can be performed by swapping the body 800 as a modular unit with a different body, each of the different bodies having a similarly position pivot member 828 so that the same chassis 20 can be reused. In some embodiments, the body 800 can be removed from the chassis 20 without the use of a crane.

Fenders

Figure 22:
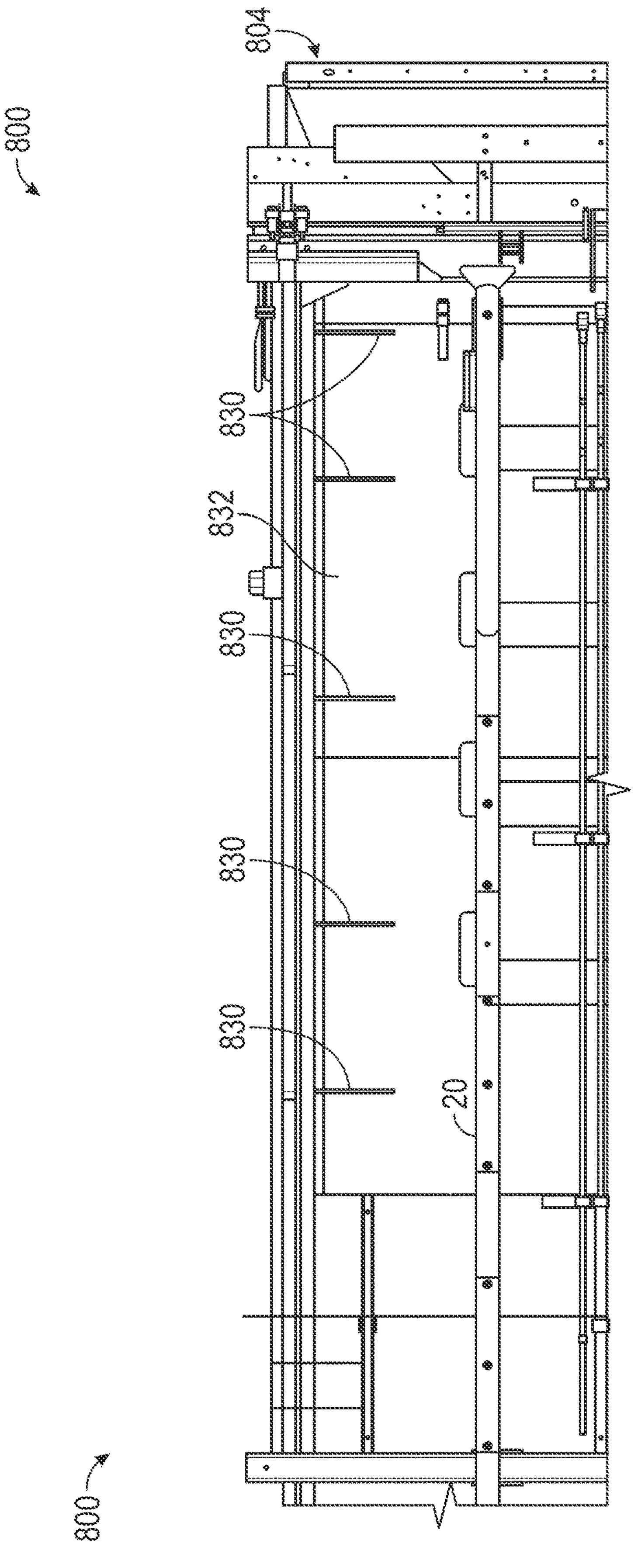
FIG. 22 is a view of the underside of the self-contained body of FIG. 14, according to an exemplary embodiment.

Referring to FIG. 22, the body 800 may include multiple brackets 830 positioned along the underside 832 of the body 800. The brackets 830 can be positioned proximate the wheel assemblies 54, and are configured to receive and removably couple with fenders of the refuse vehicle 100. In some embodiments, the fenders for the refuse vehicle 100 can be installed onto the body 800 by coupling the fenders with the brackets 830. The brackets 830 may be positioned proximate lateral sides of the body 800.

Body Accessories

Figure 23:
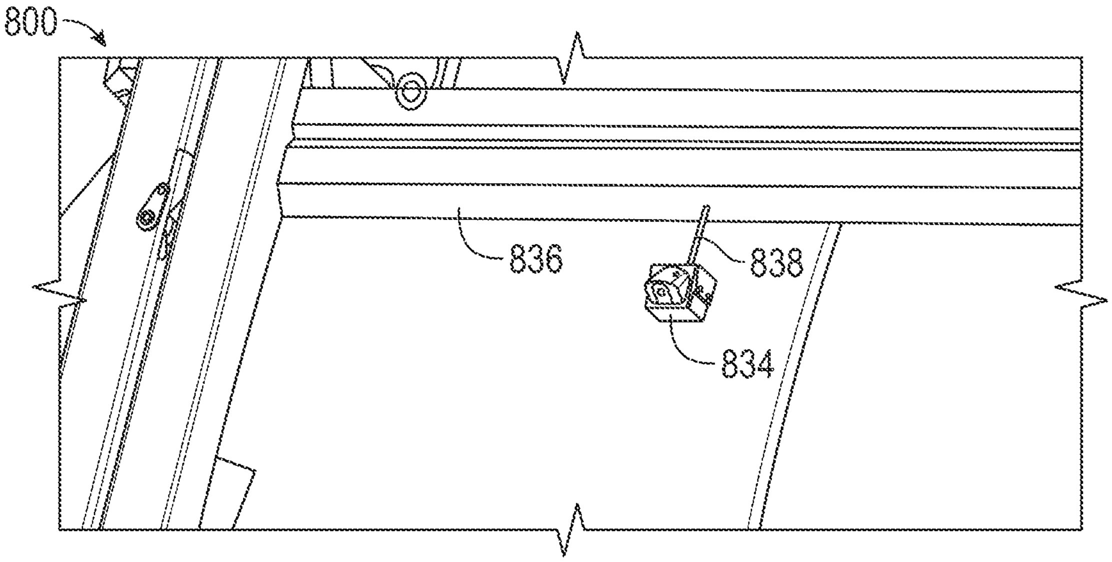
FIG. 23 is a perspective view of a portion of the exterior of the self-contained body of FIG. 14 illustrating a camera, according to an exemplary embodiment.

Referring to FIG. 23, the body 800 can include a camera 834 mounted on a side of the body 800. The camera 834 can be configured to provide image data to a controller. In some embodiments, the camera 834 is wiredly coupled with the controller via a wire 838. The wire 838 may extend through a portion of the body 800, shown as cover 836. In some embodiments, multiple cameras 834 are positioned about the body 800 (e.g., on both the left and right sides, on the tailgate 136, etc.). In some embodiments, additional cameras 834 are positioned that are not coupled with the body 800 (e.g., on the cab 40, on the tailgate 136, etc.).

Figure 25:
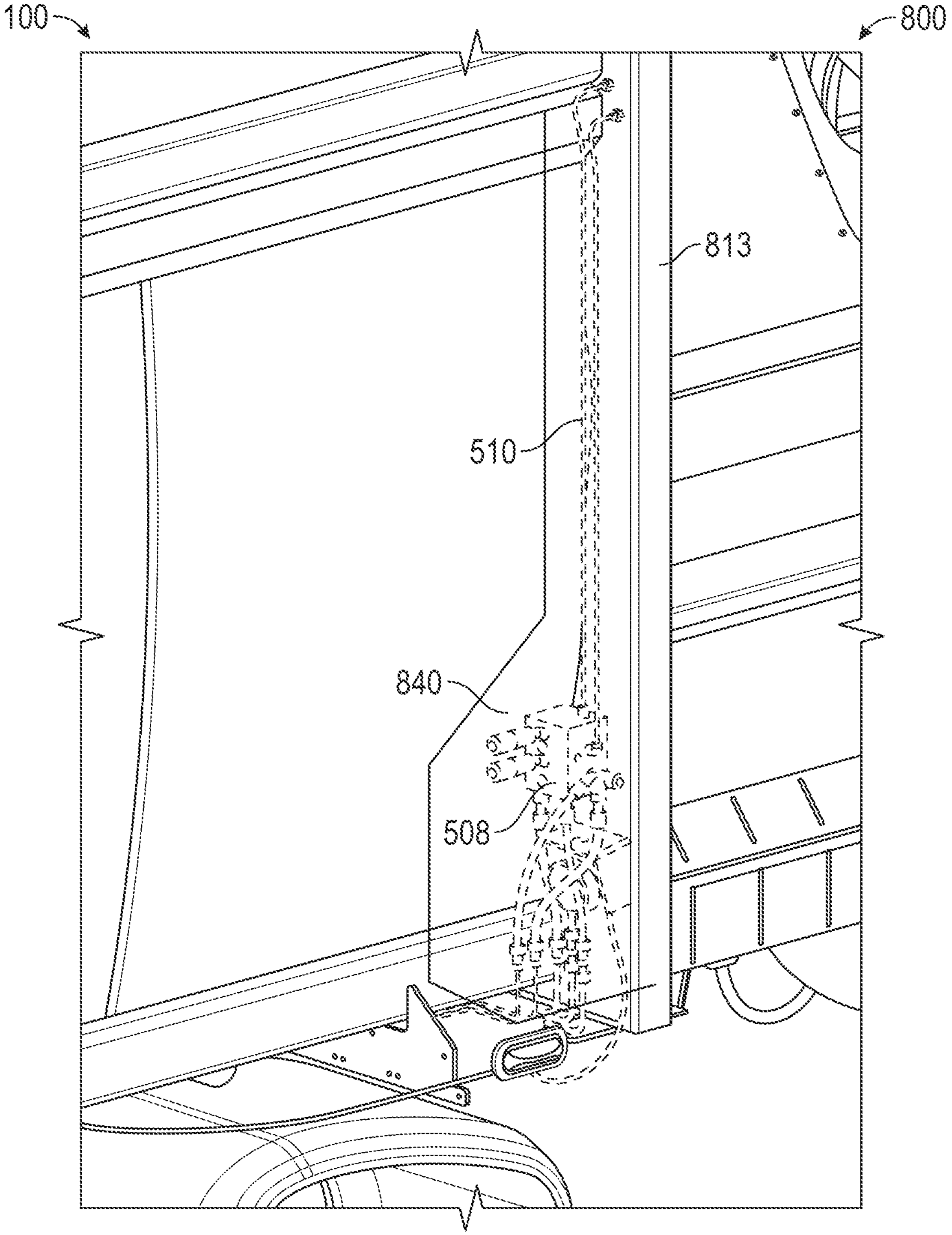
FIG. 25 is a perspective view of a portion of the hydraulic system of FIG. 16, according to an exemplary embodiment.

Referring to FIG. 25, the door/tailgate manifold 508 may be coupled with a vertical frame member 813. The door/tailgate manifold 508 may be positioned within a cover, a planar member, a surface, etc., shown as cover 840. The cover 840 may extend substantially an entire height of the body 800 to provide protection for the door/tailgate manifold 508. In some embodiments, the cover 840 also includes a working light (e.g., a light emitting diode) for a middle post or vertical frame member 813. In some embodiments, the cover 840 or the vertical frame member 813 also includes marker lights.

Figure 24:
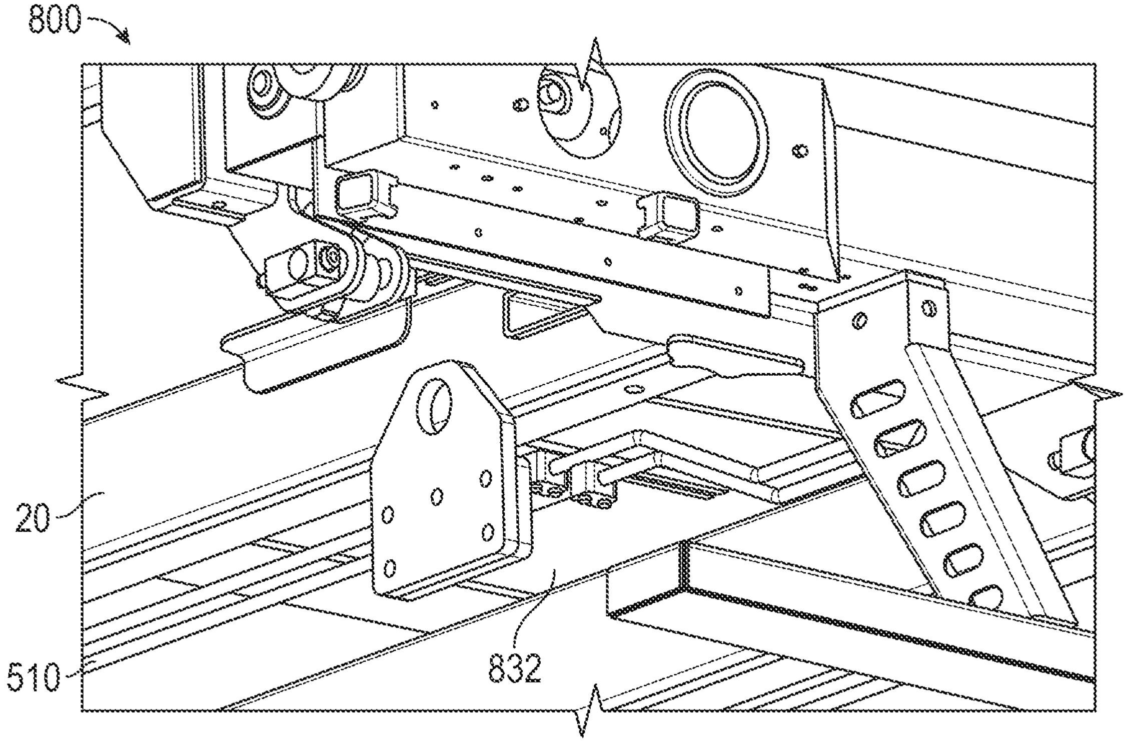
FIG. 24 is a perspective view of the underside of the self-contained body of FIG. 14, according to an exemplary embodiment.

Referring to FIG. 24, the conduits 510 of the hydraulic system 500 may extend along a longitudinal length of the body between frame rails of the chassis 20. The conduits 510 can be coupled with the underside 832 of the body 800.

Referring to FIGS. 14 and 15, the body 800 can include various tool mounts 850 for removably coupling tools (e.g., rakes, brooms, spill cleanup kits, etc.) with the body 800. The tool mounts 850 can be positioned on sides of the body 800 and fixedly coupled with sidewalls of the body 800 so that the tool mounts 850 can be accessed by users from an exterior of the refuse vehicle 100.

Body Mounts

Figure 26:
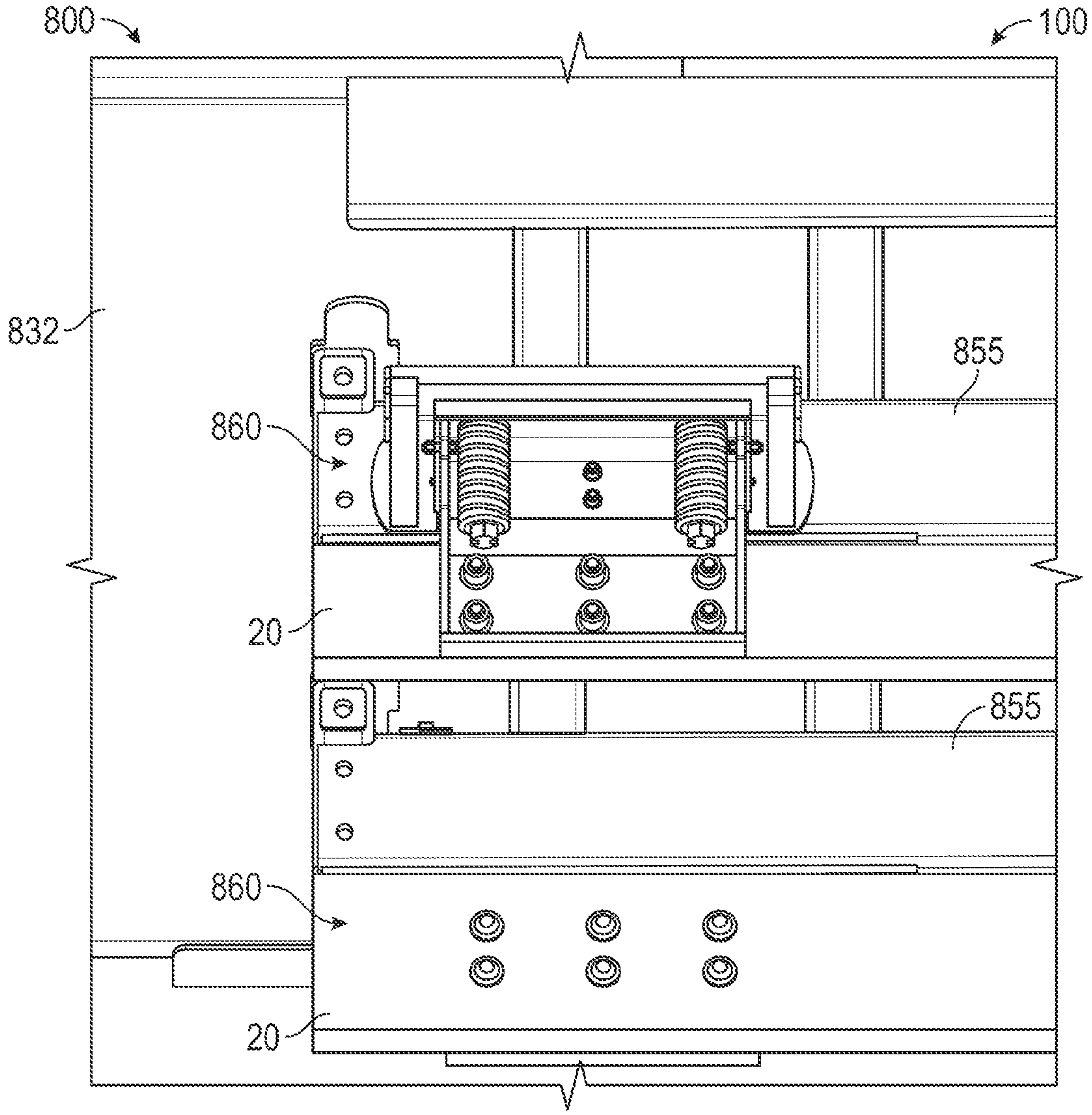
FIG. 26 is a perspective view of a body mount of the self-contained body of FIG. 14 for coupling the body with a chassis, according to an exemplary embodiment.

Referring to FIG. 26, a body mount 860 can be configured to removably couple the self-contained body 800 with the chassis 20. In some embodiments, the body mounts 860 are configured to couple longitudinally extending frame rails 855 of the body 800 with corresponding frame rails of the chassis 20. In some embodiments, the body mounts 860 are structurally similar to any of the mounts described in greater detail in U.S. application Ser. No. 17/520,022, filed Nov. 5, 2021, the entire disclosure of which is incorporated by reference herein. The body mounts 860 facilitate removal of the self-contained body 800 from the chassis 20 so that the self-contained body can be completely set up and tested (e.g., including any hydraulic and electrical systems) prior to installation on the chassis 20. The body mounts 860 can be positioned proximate an arm tube of the refuse vehicle 100. In some embodiments, the body mounts 860 integrate both lateral and vertical constraints of the body 800 relative to the chassis 20.

Electrical System

Figure 27:
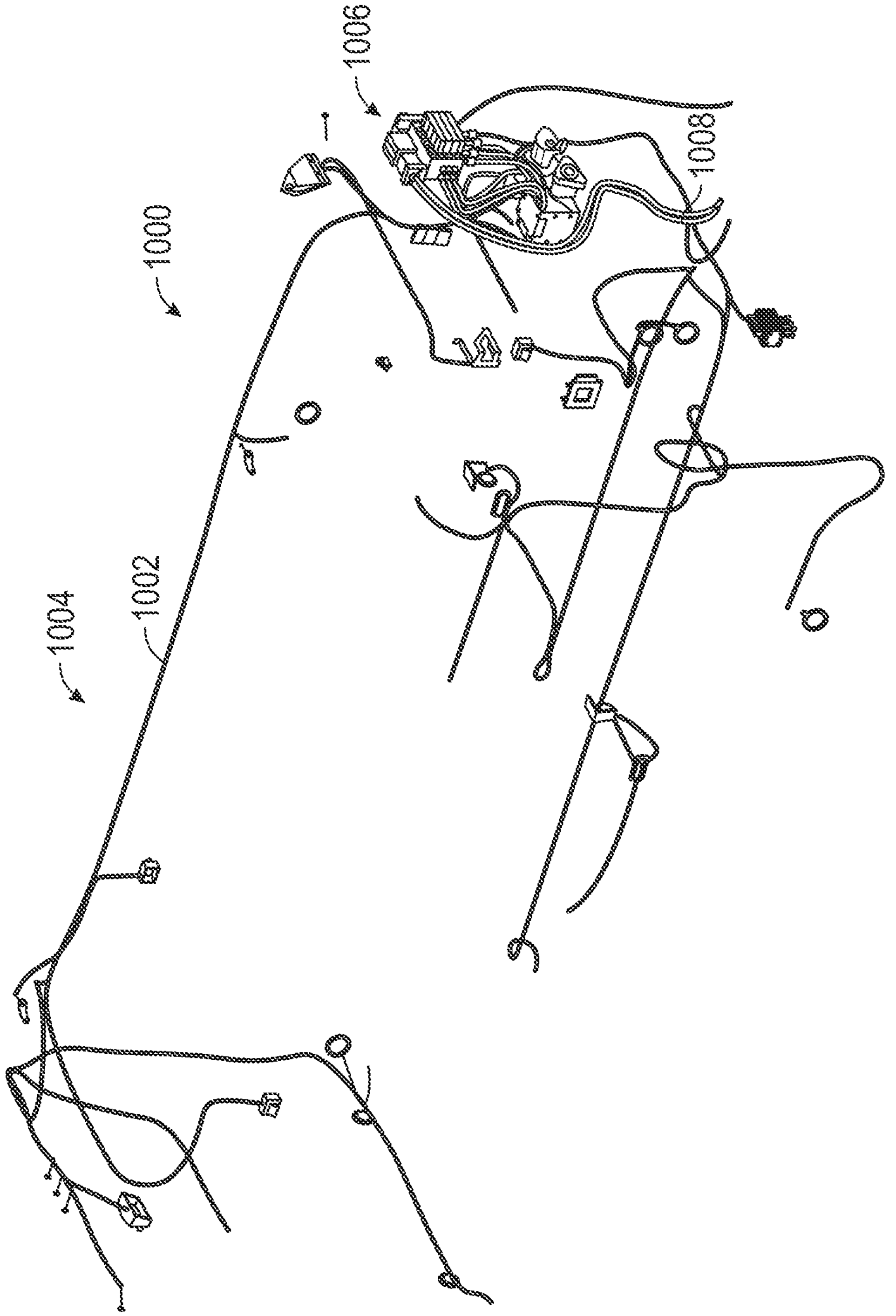
FIG. 27 is a perspective view of an electrical system of the self-contained body of FIG. 14, according to an exemplary embodiment.

Referring to FIG. 27, an electrical system 1000 of the self-contained body 800 is shown, according to some embodiments. The electrical system 1000 can be coupled with the body 800 so that the electrical system 1000 does not require coupling with the chassis 20. In some embodiments, the electrical system 1000 includes a low voltage (LV) circuit 1004, and a high voltage (HV) circuit 1006. The LV circuit 1004 can include LV wires 1002 configured to provide electrical energy and/or communicability for any components of the LV circuit 1004. The HV circuit 1006 can include HV wires 1008 configured to provide electrical energy and/or communicability for any components of the HV circuit 1004 (e.g., the hydraulic pumps, electric motors, etc.). In some embodiments, the HV circuit 1004 is positioned proximate the hydraulic system 500 at the headframe 814 (e.g., at the front end 802 of the body 800, between the body 800 and the cab 40). In some embodiments, one of the components of the LV circuit 1004 is a 360 degree camera system (e.g., camera 834).

Controller

Figure 28:
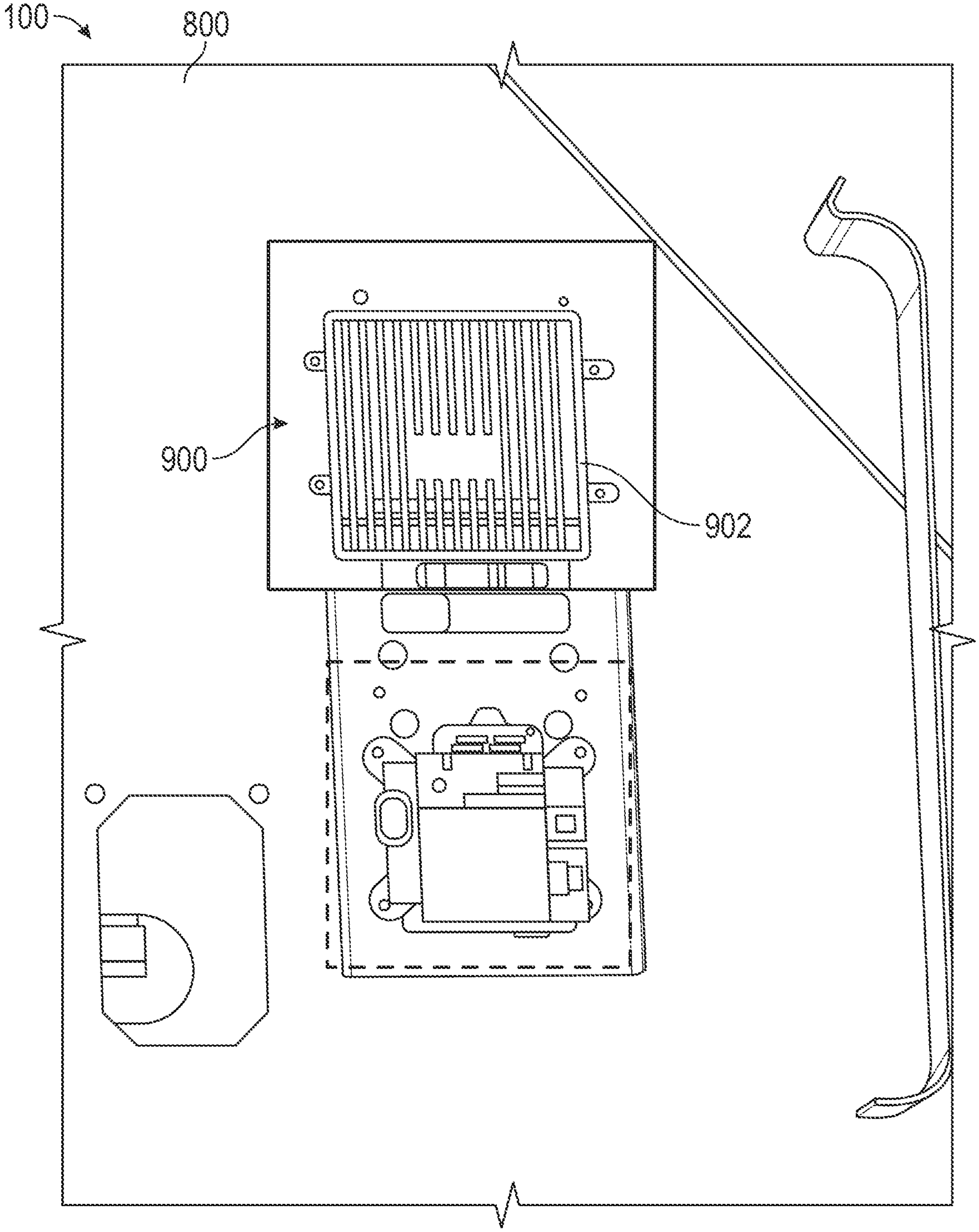
FIG. 28 is a view of a portion of the self-contained body of FIG. 14 including a controller positioned within a sub-panel, according to an exemplary embodiment.

Referring to FIG. 28, a controller 900 (e.g., a body controller) for the self-contained body 800 can be positioned within a sub-panel 902 of the body 800. In some embodiments, the sub-panel 902 of the body 800 as shown in FIG. 28 is at the front end 802 of the body 800, behind the cab 40. In some embodiments, positioning the controller 900 on the body 800 facilitates the self-containment of the body 800 so that the body 800 can be removed from the chassis 20 without requiring electrical de-coupling of the controller 900 (e.g., if the controller 900 were positioned on the chassis 20). In some embodiments, positioning of the controller 900 directly behind the cab 40 and facing the cab 40 facilitates protection of the controller 900. In some embodiments, the controller 900 is a component of the electrical system 1000.

Assembly Process

Figure 29:
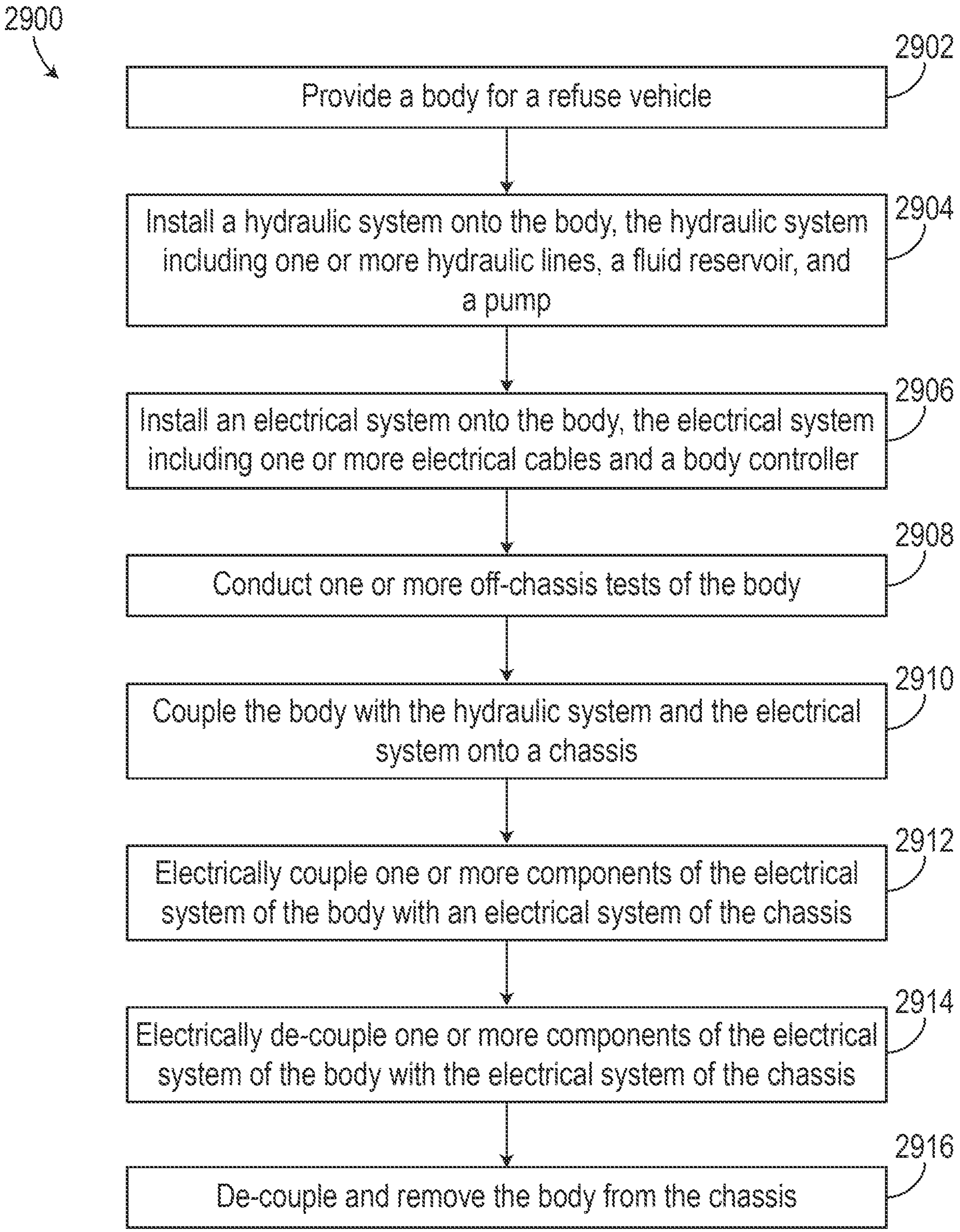
FIG. 29 is a flow diagram of a process for installing and removing the self-contained body of FIG. 14 onto a chassis, according to an exemplary embodiment.

Referring to FIG. 29, a flow diagram of a process 2900 for assembling the self-contained body 800 and installing the self-contained body 800 on a chassis includes steps 2902-2916. Process 2900 can be performed in order to provide a self-contained body that can be assembled, tested, and configured off-chassis, then installed on the chassis to provide a refuse vehicle. The self-contained body can also be removed from the chassis without requiring de-coupling of one or more components from the chassis, which would be required for refuse bodies that are not self-contained.

The process 2900 includes providing a body for a refuse vehicle (step 2902), according to some embodiments. In some embodiments, step 2902 includes providing the refuse compartment 130 and the hopper 176 as an assembled unit. The refuse compartment 130 may include the tailgate 136, the storage volume 134, and one or more panels or sidewalls (e.g., a roof, a floor, etc.).

The process 2900 includes installing a hydraulic system onto the body, the hydraulic system including one or more hydraulic lines, a fluid reservoir, and a pump (step 2904), according to some embodiments. In some embodiments, the hydraulic system is the hydraulic system 500. The hydraulic system is installed by coupling (e.g., via fasteners) the one or more components onto the body such as the hydraulic lines, the fluid reservoir, and the pump, according to some embodiments. In some embodiments, the hydraulic system also includes an electric motor that is configured to drive the pump. Step 2904 can also include installing one or more accessories onto the body that are configured to receive hydraulic fluid and use the hydraulic fluid to operate (e.g., a grabber assembly, a lift assembly, etc.).

The process 2900 includes installing an electrical system onto the body, the electrical system including one or more electrical cables and a body controller (step 2906), according to some embodiments. In some embodiments, step 2906 includes one or more sensors, one or more batteries, etc. The electrical system is the electrical system 1000, according to some embodiments. The electrical system also includes cameras, detectors, distance sensors, radar devices, lidar devices, (e.g., devices or sensors of an awareness system), according to some embodiments.

The process 2900 includes conducting one or more off-chassis tests of the body (step 2908), according to some embodiments. In some embodiments, the off-chassis tests are performed on the hydraulic system or the electrical system to ensure that the hydraulic system and the electrical system are operating properly before installing the body onto a chassis. In some embodiments, step 2908 includes electrically coupling one or more electrical devices (e.g., the electrical system, the electric motor that drives the pump of the hydraulic system, etc.) to a power source that is off-body.

The process 2900 includes coupling the body with the hydraulic system and the electrical system onto a chassis (step 2910), according to some embodiments. In some embodiments, step 2910 includes electrically de-coupling the one or more electrical components that are installed on the body from the body before installing the body onto the chassis. In some embodiments, step 2910 includes installing the body onto a universal chassis that is configured to receive different types of bodies (e.g., a side loading refuse body, a front loading refuse body, etc.). In some embodiments, one or more couplers are used to couple the body onto the chassis to perform step 2910.

The process 2900 includes electrically coupling one or more components of the electrical system of the body with an electrical system of the chassis (step 2912), according to some embodiments. In some embodiments, step 2912 includes electrically and/or communicably coupling the body controller of the body with a chassis controller of the chassis. In some embodiments, step 2912 includes electrically coupling one or more electrical components of the body with a power source (e.g., an energy storage system or batteries) if the power source is provided on the chassis and not on the body. In some embodiments, step 2912 includes fluidly coupling one or more hydraulic lines of the hydraulic system with a hydraulic component of the chassis. In some embodiments, once step 2912 is completed, the refuse vehicle is fully assembled (e.g., the body and the chassis) and ready for deployment.

The process 2900 includes electrically de-coupling one or more components of the electrical system of the body with the electrical system of the chassis (step 2914), according to some embodiments. In some embodiments, step 2914 includes de-coupling one or more electrical wires that are connected between the chassis and the body or de-coupling one or more hydraulic lines that are connected between the chassis and the body. In some embodiments, step 2914 includes performing the inverse (e.g., de-coupling) of steps 2910-2912.

The process 2900 includes de-coupling and removing the body from the chassis (step 2916), according to some embodiments. In some embodiments, step 2916 includes performing the inverse of step 2910, In some embodiments, the body can be removed from the chassis without de-coupling or removing one or more hydraulic lines, the fluid reservoir, or the pump of the hydraulic system from the body. In some embodiments, step 2916 can be performed to remove the body from the chassis without removing one or more electrical components (e.g., the body controller) from the body.

As utilized herein, the terms “approximately,” “about,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:

a chassis; and a body assembly configured to be removably coupled with the chassis, the body assembly comprising:

a refuse body;

a hydraulic system comprising a hydraulic pump and a reservoir, the hydraulic pump and the reservoir directly coupled to the refuse body; and an electrical system comprising a body controller coupled with the refuse body; and a lift assembly and a grabber assembly, the lift assembly configured to receive pressurized hydraulic fluid from the hydraulic pump and operate to lift the grabber assembly, the grabber assembly configured to receive pressurized hydraulic fluid from the hydraulic pump and operate to drive a pair of grabber fingers to grasp a refuse container;

wherein the body assembly is configured to be removed from the chassis without requiring decoupling of the hydraulic pump or the reservoir from the refuse body, and without requiring decoupling of the body controller from the refuse body; and wherein the lift assembly and the grabber assembly are coupled on the refuse body such that the body assembly can be removed from the chassis without removing the lift assembly or the grabber assembly from the refuse body.

2. The refuse vehicle of claim 1, further comprising a hydraulic accessory configured to receive pressurized hydraulic fluid from the hydraulic pump and perform an operation using the pressurized hydraulic fluid, the hydraulic accessory coupled on the refuse body such that the body assembly can be removed from the chassis without removing the hydraulic accessory from the refuse body.

3. The refuse vehicle of claim 1, wherein the hydraulic pump and the reservoir are coupled on a longitudinal front end of the refuse body, between the longitudinal front end of the refuse body and a cab of the refuse vehicle.

4. The refuse vehicle of claim 1, wherein the electrical system further comprises a plurality of electric wires, the plurality of electric wires directly coupled to the refuse body such that the body assembly can be removed from the chassis without removing the plurality of electric wires from the refuse body.

5. The refuse vehicle of claim 1, wherein the hydraulic system further comprises a packer manifold configured to direct pressurized hydraulic fluid to a packer of the refuse vehicle, and an arm manifold configured to direct pressurized hydraulic fluid to an arm of the refuse vehicle, the packer manifold and the arm manifold coupled to the refuse body such that the body assembly can be removed from the chassis without removing the arm manifold or the packer manifold from the refuse body.

6. The refuse vehicle of claim 1, wherein the body assembly comprises a pair of rails that extend along a bottom of the body assembly and a plurality of body mounts, the body mounts coupled with the pair of rails of the body assembly and configured to removably couple with the chassis.

7. The refuse vehicle of claim 1, wherein the refuse body defines a refuse compartment for loading, storing, and discharging refuse.

8. The refuse vehicle of claim 1, wherein the electrical system further comprises a plurality of accessories, the plurality of accessories comprising at least one camera, wherein one or more communication wires extend between the body controller and the at least one camera through a cover that extends along an external surface of the refuse body.

9. A self-contained body assembly for a refuse vehicle, the self-contained body assembly comprising:

a refuse body;

a hydraulic system comprising a hydraulic pump and a reservoir, the hydraulic pump and the reservoir directly coupled to the refuse body;

an electrical system comprising a body controller coupled with the refuse body;

a lift assembly; and a grabber assembly;

wherein the self-contained body assembly is configured to be removably coupled with a chassis and removed from the chassis without decoupling the hydraulic system from the refuse body and without requiring decoupling of the body controller from the refuse body;

wherein the lift assembly is configured to receive pressurized hydraulic fluid from the hydraulic pump and operate to lift the grabber assembly, the grabber assembly is configured to receive pressurized hydraulic fluid from the hydraulic pump and operate to drive a pair of grabber fingers to grasp a refuse container; and wherein the lift assembly and the grabber assembly are coupled on the refuse body such that the self-contained body assembly can be removed from the chassis without removing the lift assembly or the grabber assembly from the refuse body.

10. The self-contained body assembly of claim 9, further comprising a hydraulic accessory configured to receive pressurized hydraulic fluid from the hydraulic pump and perform an operation using the pressurized hydraulic fluid, the hydraulic accessory coupled on the refuse body such that the self-contained body assembly can be removed from the chassis without removing the hydraulic accessory from the refuse body.

11. The self-contained body assembly of claim 9, wherein the hydraulic pump and the reservoir are coupled on a longitudinal front end of the refuse body, between the longitudinal front end of the refuse body and a cab of the refuse vehicle.

12. The self-contained body assembly of claim 9, wherein the electrical system further comprises a plurality of electric wires, the plurality of electric wires directly coupled to the refuse body such that the self-contained body assembly can be removed from the chassis without removing the plurality of electric wires from the refuse body.

13. The self-contained body assembly of claim 9, wherein the hydraulic system further comprises a packer manifold configured to direct pressurized hydraulic fluid to a packer of the refuse vehicle, and an arm manifold configured to direct pressurized hydraulic fluid to an arm of the refuse vehicle, the packer manifold and the arm manifold coupled to the refuse body such that the self-contained body assembly can be removed from the chassis without removing the arm manifold or the packer manifold from the refuse body.

14. The self-contained body assembly of claim 9, further comprising a pair of rails that extend along a bottom of the self-contained body assembly and a plurality of body mounts, the body mounts coupled with the pair of rails of the self-contained body assembly and configured to removably couple with the chassis.

15. The self-contained body assembly of claim 9, wherein the refuse body defines a refuse compartment for loading, storing, and discharging refuse.

16. The self-contained body assembly of claim 9, wherein the electrical system further comprises a plurality of accessories, the plurality of accessories comprising at least one camera, wherein one or more communication wires extend between the body controller and the at least one camera through a cover that extends along an external surface of the refuse body.

17. The self-contained body assembly of claim 9, wherein the self-contained body assembly is configured to pivotally couple with the chassis through a pivotal coupler at a rear end of the chassis and comprises a plurality of lift cylinders positioned at a front end of the self-contained body assembly for driving the self-contained body assembly to pivot relative to the chassis about the pivotal coupler.

18. A refuse vehicle comprising:

a chassis; and a body assembly configured to be removably coupled with the chassis, the body assembly comprising:

a refuse body;

a hydraulic system comprising a hydraulic pump, a reservoir, a packer manifold, and an arm manifold, wherein the hydraulic pump and the reservoir are directly coupled to the refuse body, wherein the packer manifold is configured to direct pressurized hydraulic fluid to a packer of the refuse vehicle, and the arm manifold is configured to direct pressurized hydraulic fluid to an arm of the refuse vehicle, the packer manifold and the arm manifold coupled to the refuse body such that the body assembly can be removed from the chassis without removing the arm manifold or the packer manifold from the refuse body; and an electrical system comprising a body controller coupled with the refuse body;

wherein the body assembly is configured to be removed from the chassis without requiring decoupling of the hydraulic pump or the reservoir from the refuse body, and without requiring decoupling of the body controller from the refuse body.

19. A refuse vehicle comprising:

a chassis; and a body assembly configured to be removably coupled with the chassis, the body assembly comprising:

a refuse body;

a hydraulic system comprising a hydraulic pump and a reservoir, the hydraulic pump and the reservoir directly coupled to the refuse body; and an electrical system comprising a body controller coupled with the refuse body, and a plurality of accessories, the plurality of accessories comprising at least one camera, wherein one or more communication wires extend between the body controller and the at least one camera through a cover that extends along an external surface of the refuse body;

wherein the body assembly is configured to be removed from the chassis without requiring decoupling of the hydraulic pump or the reservoir from the refuse body, and without requiring decoupling of the body controller from the refuse body.

20. A self-contained body assembly for a refuse vehicle, the self-contained body assembly comprising:

a refuse body;

a hydraulic system comprising a hydraulic pump, a reservoir, a packer manifold, and an arm manifold, the hydraulic pump and the reservoir directly coupled to the refuse body, the packer manifold configured to direct pressurized hydraulic fluid to a packer of the refuse vehicle, the arm manifold configured to direct pressurized hydraulic fluid to an arm of the refuse vehicle; and an electrical system comprising a body controller coupled with the refuse body;

wherein the self-contained body assembly is configured to be removably coupled with a chassis and removed from the chassis without decoupling the hydraulic system from the refuse body and without requiring decoupling of the body controller from the refuse body; and wherein the packer manifold and the arm manifold are coupled to the refuse body such that the self-contained body assembly can be removed from the chassis without removing the arm manifold or the packer manifold from the refuse body.

21. A self-contained body assembly for a refuse vehicle, the self-contained body assembly comprising:

a refuse body;

a hydraulic system comprising a hydraulic pump and a reservoir, the hydraulic pump and the reservoir directly coupled to the refuse body; and an electrical system comprising a body controller coupled with the refuse body and a plurality of accessories, the plurality of accessories comprising at least one camera, wherein one or more communication wires extend between the body controller and the at least one camera through a cover that extends along an external surface of the refuse body;

wherein the self-contained body assembly is configured to be removably coupled with a chassis and removed from the chassis without decoupling the hydraulic system from the refuse body and without requiring decoupling of the body controller from the refuse body.

* * * * *